(12) United States Patent
Nel

(10) Patent No.: US 6,507,823 B1
(45) Date of Patent: Jan. 14, 2003

(54) SYSTEM AND METHOD FOR ON-LINE PURCHASING OF GOODS AND SERVICES

(75) Inventor: Pierre Hercules Nel, PO Box 20235, Alkantrant, Pretoria, Gauteng (ZA), 005

(73) Assignee: Pierre Hercules Nel, Lynnwoodridge (ZA)

(*) Notice: Subject to any disclaimer, the term of this patent is extended or adjusted under 35 U.S.C. 154(b) by 0 days.

(21) Appl. No.: 08/529,216

(22) Filed: Sep. 15, 1995

(30) Foreign Application Priority Data

| May 29, 1904 | (ZA) | 94/2983 |
|---|---|---|
| May 29, 1904 | (ZA) | 94/2984 |
| Sep. 23, 1993 | (ZA) | 93/6849 |
| Oct. 8, 1993 | (ZA) | 93/7467 |
| Dec. 6, 1993 | (ZA) | 93/9100 |
| Feb. 7, 1994 | (ZA) | 94/0794 |
| Mar. 31, 1994 | (ZA) | 94/2278 |
| Mar. 31, 1994 | (ZA) | 94/2280 |
| Apr. 14, 1994 | (ZA) | 94/2561 |
| May 30, 1994 | (ZA) | 94/3769 |
| Sep. 9, 1994 | (ZA) | 94/6941 |
| Oct. 7, 1994 | (ZA) | 94/8762 |
| Nov. 7, 1994 | (ZA) | 94/8763 |
| Nov. 7, 1994 | (ZA) | 94/8764 |
| Nov. 7, 1994 | (ZA) | 94/8765 |
| Nov. 7, 1994 | (ZA) | 94/8766 |
| Nov. 11, 1994 | (ZA) | 94/8943 |
| Dec. 27, 1994 | (ZA) | 94/10297 |
| Dec. 27, 1994 | (ZA) | 94/10321 |

(51) Int. Cl.[7] ............................................. G06F 17/60
(52) U.S. Cl. ........................................ 705/26; 705/35
(58) Field of Search ........................... 395/201, 226, 395/227; 705/26, 27, 35–42

(56) References Cited

U.S. PATENT DOCUMENTS

| 3,513,298 A | 5/1970 | Riddle et al. |
|---|---|---|
| 3,641,497 A | 2/1972 | Constable |
| 3,648,020 A | 3/1972 | Tateisi et al. |

(List continued on next page.)

FOREIGN PATENT DOCUMENTS

| EP | 0513484 A2 | 11/1992 |
|---|---|---|
| EP | 0519071 A1 | 12/1992 |
| EP | 690 399 A2 * | 1/1996 |
| GB | 2071369 | 9/1981 |
| GB | 2109966 A | 6/1983 |

(List continued on next page.)

OTHER PUBLICATIONS

Sterne, "A National EFTPos Network", Irish Computer, vol. 12, No. 10, Dec. 1988.*

'La Caixa' terminal for buying tickets or for the payment of fees (and English translation) allegedly appear a Jun. 1993 Spanish paper.

Geographical distribution of branch network as of Dec. 31, 1993.

(List continued on next page.)

*Primary Examiner*—Frantzy Poinvil
(74) *Attorney, Agent, or Firm*—Nixon & Vanderhye P.C.

(57) ABSTRACT

A method of conducting a financial transaction between a purchaser and a vendor of a product, the purchaser and the vendor each having an account held at respective first (A) and second (B) financial institutions. The method requires the provision of at least one vendor database 24 including product-related information, for example regarding the availability and price of a product. A publicly accessible data exchange terminal, typically an automatic teller machine (ATM) 112, is linked to the vendor database. The system then interrogates the purchaser to obtain transaction-related information via the terminal by requiring the purchaser to indicate a number of transaction options. The terminal is linked to the first financial and second financial institutions to provide access to the purchaser's and vendor's accounts. The system then transfers funds electronically between accounts for the value of the transaction. Of course, the first and second financial institutions may be the same financial institution.

32 Claims, 47 Drawing Sheets

U.S. PATENT DOCUMENTS

| | | |
|---|---|---|
| 3,657,521 A | 4/1972 | Constable |
| 3,697,729 A | 10/1972 | Edwards et al. |
| 3,760,158 A | 9/1973 | Whitehead et al. |
| 3,761,682 A | 9/1973 | Barnes et al. |
| 3,921,196 A | 11/1975 | Patterson |
| 3,970,992 A | 7/1976 | Bootbroyd et al. |
| 4,247,759 A | 1/1981 | Yuris et al. |
| 4,277,837 A * | 7/1981 | Stuckert .................... 364/900 |
| 4,305,059 A | 12/1981 | Benton |
| 4,322,612 A | 3/1982 | Lange |
| 4,341,951 A | 7/1982 | Benton |
| 4,390,968 A | 6/1983 | Hennessy et al. |
| 4,449,186 A | 5/1984 | Kelly et al. |
| 4,536,647 A | 8/1985 | Atalla et al. |
| 4,567,359 A | 1/1986 | Lockwood |
| 4,634,845 A | 1/1987 | Hale et al. |
| 4,652,276 A | 3/1987 | Burden |
| 4,669,730 A | 6/1987 | Small |
| 4,689,478 A | 8/1987 | Hale et al. |
| 4,694,397 A | 9/1987 | Grant et al. |
| 4,799,156 A | 1/1989 | Shavit et al. |
| 4,815,741 A | 3/1989 | Small |
| 4,947,028 A | 8/1990 | Gorog |
| 4,992,940 A | 2/1991 | Dworkin |
| 5,047,613 A | 9/1991 | Swegen et al. |
| 5,202,825 A | 4/1993 | Miller et al. |
| 5,220,501 A | 6/1993 | Lawlor et al. |
| 5,231,571 A * | 7/1993 | D'Agostino ................ 364/401 |
| 5,239,480 A | 8/1993 | Huegel |
| 5,265,033 A | 11/1993 | Vajk et al. |
| 5,333,257 A | 7/1994 | Merrill et al. |
| 5,408,417 A | 4/1995 | Wilder |
| 5,473,143 A | 12/1995 | Vak et al. |
| 5,475,585 A * | 12/1995 | Bush ......................... 364/401 |
| 5,576,951 A | 11/1996 | Lockwood |
| 5,948,040 A | 9/1999 | DeLorme et al. |

FOREIGN PATENT DOCUMENTS

| | | |
|---|---|---|
| WO | WO 93/02422 | 2/1993 |
| WO | WO 93/04435 | 3/1993 |
| WO | WO 93/06556 | 4/1993 |
| WO | WO 93/19427 | 9/1993 |
| WO | WO 94/11836 | 5/1994 |
| ZA | 75/7569 | 11/1976 |

OTHER PUBLICATIONS

"Computer Systems Make At–home Banking A Reality", Janie L. Rosman, *Fairfield County Business Journal*, Feb. 1, 1993.

"Online Resources' Home Banking Patent Hits Hot Buttons Throughout Industry", Lisa Fickenscher, *American Banker*, Feb. 17, 1994.

\* cited by examiner

Fig. 10(i)

```
THE  A  BANK
───────────────────────────
1994-11-12       16:23:01

ATM no. 122-34155

BALANCE        R 6712.00
Loss Bet  ( R   300.00 )
End Balance R 6412.00
```

┌─ ─ ─ ─ ─ ─ ─ ─ ─ ─ ─ ─ ─ ─ ─ ─ ┐
| Product Information
|  Race meeting    TVL
|  Race No.          3
|  Race Amount     R 300
|  Bet Type        Each Way
|  Horse no.         13
└─ ─ ─ ─ ─ ─ ─ ─ ─ ─ ─ ─ ─ ─ ─ ─ ┘

*Your type of bank*

Fig. 11(i)

*THE A BANK*

1994-11-12          16:23:01

ATM no. 122-34455

BALANCE        R 6712.88
SHARES      ( R  775.88 )

AVAILABLE R 5937.88

```
100 ORYX SHARES
AT R 7.75 EACH =
R 775.88
```

*Your type of bank*

```
THE A BANK

Funds Balance      2000.00
Products          -  20.00
Now balance        1980.00

Product Information
  2 Tickets / seats
  @ $ 10.00 each = $20
  TUL
  FMB Staduim
  Back
  Row AA   Seat 18 - 19

Your type of bank
```

SYSTEM AND METHOD FOR ON-LINE PURCHASING OF GOODS AND SERVICES

BACKGROUND OF THE INVENTION

THIS invention relates to a system for conducting a financial transaction between a purchaser and a vendor of a product, and to a method of conducting such transactions.

Efforts by banks to provide customers with improved service and access to banking facilities have resulted in an increasingly large number of automatic teller machines (ATM's) being installed at shopping centres and at banks themselves. The ATM network has consequently grown to cover almost every corner of the country and, at least in urban areas, an ATM can easily be accessed by a large percentage of the population.

ATM's are particularly attractive to both banks and customers as they allow bank customers to perform routine banking transactions at locations and times that are convenient to the customer. The need for over-the-counter service personnel at banks has also been reduced as more customers make use of ATM's to withdraw and deposit cash, and to obtain financial statements relating to their bank accounts. Banks have also benefitted from the increased number of banking transactions that have occurred as a result of the proliferation of ATM's in that increased revenues have been generated as transaction fees.

While the success of ATM's is undoubted, the services currently offered by ATM's are limited, and the capabilities of ATM's have not been fully exploited.

SUMMARY OF THE INVENTION

According to the invention there is provided a method of conducting a financial transaction between a purchaser and a vendor of a product, the method comprising the steps of:
  providing a computerized banking system comprising a plurality of financial institutions; each of said plurality of financial institutions comprising a computer centre comprising a plurality of computer based client accounts, an electronic data network interconnecting said computer centres; and a plurality of data exchange terminals connected to the said network;
  providing at least one vendor database including product related information connected to the said network;
  communicating to the database via the network product related information regarding a product required by the purchaser and which information is provided by the purchaser via one of said terminals; and
  automatically initiating payment by the purchaser for the product in an amount equal to the value of the transaction.

According to a preferred embodiment of the invention there is provided a method of conducting a financial transaction between a purchaser and a vendor of a product, the purchaser and the vendor being associated with respective first and second accounts held at respective first and second financial institutions, the method comprising the steps of:
  providing at least one vendor database including product-related information;
  linking a data exchange terminal to the at least one vendor database;
  obtaining transaction-related information from the purchaser via the data exchange terminal;
  communicating the transaction-related information to the at least one vendor database;
  linking the terminal to the first financial institution to provide access to the first account;
  linking the terminal to the second financial institution to provide access to the second account; and
  transferring funds electronically between the first and second accounts for the value of the transaction.

The first and second financial institutions may comprise the same financial institution.

The transferring of funds electronically typically may involve debiting the first account and crediting the second account.

The method preferably includes the step of obtaining an access code from the purchaser to verify authorization of the transaction.

In one envisaged application, the funds may be transferred electronically between the first and second accounts in real time response at the conclusion of the transaction.

Alternatively, the funds may be transferred electronically between the first and second account at a predetermined future time.

The terminal preferably includes display means, and the method preferably includes the step of displaying at least one enquiry menu on the display means to obtain transaction-related information from the purchaser.

The method may include the step of incorporating icons associated with options relating to the transaction into the at least one enquiry menu so that the purchaser is able to provide the transaction-related information by selecting an icon displayed on the display means.

The method preferably includes the steps of displaying at least part of the product-related information on the display means, and updating the product-related information in real time response or on the occurrence of a transaction between the purchaser and the vendor.

Typically, the transaction-related information may include at least the value of the transaction and details of the first account to or from which funds are to be electronically transferred.

The method preferably includes any one or more of the steps of verifying the availability of funds in the first account, the availability of the vendor product or the qualification of the purchaser to perform the transaction before conclusion of the transaction.

Conveniently, the method may include the step of printing a record of the transaction which serves as proof of the transaction.

The method may also include the step of reading indicator means at the terminal, the indicator means being configurable by the purchaser to indicate the transaction-related information.

In the envisaged embodiment, the method may include the step of incorporating the transaction-related information into a statement issued by the first or second financial institution to the purchaser or vendor.

According to a second aspect of the invention there is provided a system for conducting a financial transaction between a purchaser and a vendor of products, the system comprising:
  a computerized banking system comprising;
    a plurality of financial institutions;
    each of said plurality of financial institutions comprising a computer centre comprising a plurality of computer based client accounts;
    said computer centres being interconnected by an electronic data network;
    a plurality of data exchange terminals connected to the network;

at least one vendor database comprising product related information connected to said network; and system software for facilitating communication of product related information between said plurality of publicly accessible terminals and the said at least one vendor database and for initiating payment by the purchaser for products purchased.

According to a preferred embodiment of this aspect of the invention there is provided a system for conducting a financial transaction between a purchaser and vendor of a product, the purchaser and the vendor being associated with respective first and second accounts held at respective first and second financial institutions, the system comprising:

a data exchange terminal including data input and output means;

at least one vendor database including product-related information;

communication means for linking the terminal to the at least one vendor database, the first financial institution and the second financial institution; and system software for facilitating communication between the terminal, the at least one vendor database, the first financial institution and the second financial institution, and for transferring funds electronically between the first and the second accounts for the value of the transaction.

The first and second financial institution may be the same financial institution.

The data exchange terminal is preferably a bank service terminal, such as an ATM.

The communication means preferably comprises an ATM network to which the terminal, the at least one vendor database, and the first and second financial institutions are linked to facilitate the communication therebetween.

Conveniently, the system software preferably facilitates the transfer of funds electronically between the first and second accounts in real time response at the conclusion of the transaction, or at a future predetermined time.

The terminal, the first or second financial institution or the at least one vendor database may have storage means for storing the product-related information, at least part of the system software or transaction records, and wherein the product-related information or the transaction records are accessible at the publicly accessible terminal.

The system may include a portable storage device adapted to store product-related information and/or at least part of the system software and/or transaction records.

The portable storage means preferably comprises a smart card.

The product-related information is preferably accessible via the data output means of the terminal and may be updatable in real time or on the occurrence of a transaction between the purchaser and the vendor.

The data output means of the terminal preferably includes a screen, and the system software includes menu drivers for producing enquiry menus on the screen using which the purchaser provides transaction-related information via the data input means of the terminal to the system.

The enquiry menus may include icons associated with transaction options, and the purchaser is preferably able to select a transaction option by selecting an icon using the data input means.

The communication means may include conventional telephone lines and interface means for allowing the at least one vendor database to communicate with the terminal, utilizing established ATM message protocols.

Typically, the terminal may include printing means for issuing a record of the transaction or a voucher which serves as proof of the transaction.

In a preferred embodiment, the data input means of the terminal may include a reader for reading an indicator means configured by the purchaser to indicate transaction-related information.

The reader preferably comprises an optical reading device, and the indicator means comprises a card configurable to visually indicate the transaction-related information.

The invention also includes within its scope a system for conducting a financial transaction between a purchaser and a vendor of products, the system comprising an electronic data network including bank service terminals for use by a purchaser; at least one vendor database comprising product related information connected to the network; and system software for facilitating communication of product related information between said terminals and the said at least one vendor database and for initiating payment by the purchaser for products purchased.

BRIEF DESCRIPTION OF THE DRAWINGS

FIG. 10(i) shows a voucher or transaction record that is produced by the ATM at the conclusion of the transaction of FIGS. 10(a) to (h);

FIG. 11(i) shows a voucher or transaction record that is produced by the ATM at the conclusion of the transaction of FIGS. 11(a) to (h);

FIGS. 12(a) to (h) show a series of screens showing menus for exercising transaction options relating to a ticket purchasing transaction;

FIG. 12(i) shows a voucher or transaction record that is produced by the ATM at the conclusion of the transaction of FIGS. 12(a) to (h);

DESCRIPTION OF EMBODIMENTS

For the purposes of this specification, the term "data exchange terminal" shall be taken to include bank service terminals such as an automatic teller machine (ATM), a so-called self service teller (SST) and a client-activated terminal (CAT).

Figure 17:
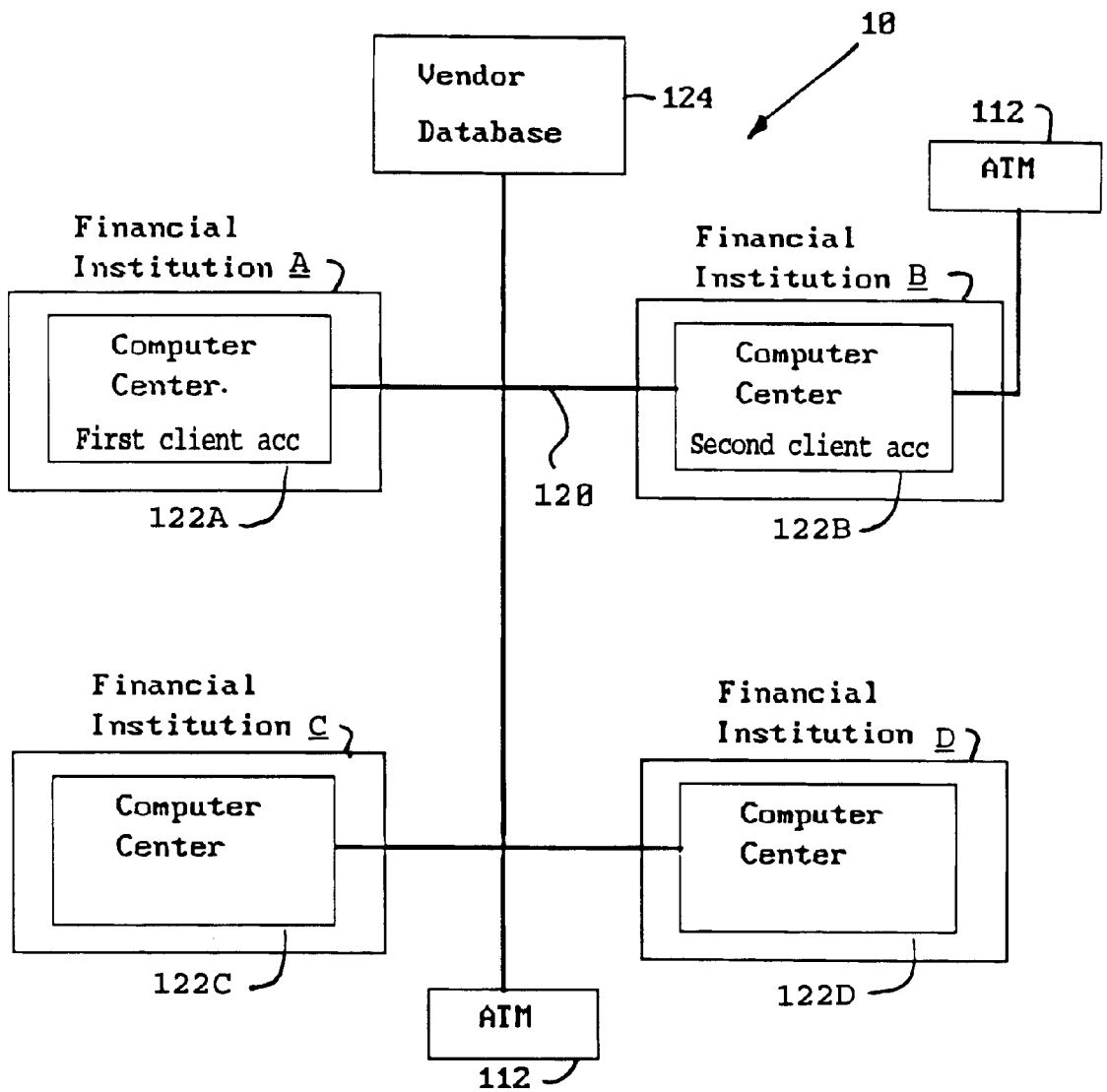
FIG. 17 is a basic block diagram of the transaction system according to the invention.

As shown in FIG. 17, the invention provides a transaction system 10 wherein a vendor data base 124 comprising information relating to vendible products is connected to an electronic data network 120 extending between a plurality of financial institutions A, B, C and D comprising computer centres 122A, 122B, 122C and 122D respectively. Also connected to the network are a plurality of ATM's 112. The system further comprises system software enabling a user to utilise the ATM 112 to purchase a product and the system to initiate payment for the transaction, for example by sending out an invoice or electronically transferring funds from an account of the purchaser to an account of the vendor.

Figure 1:
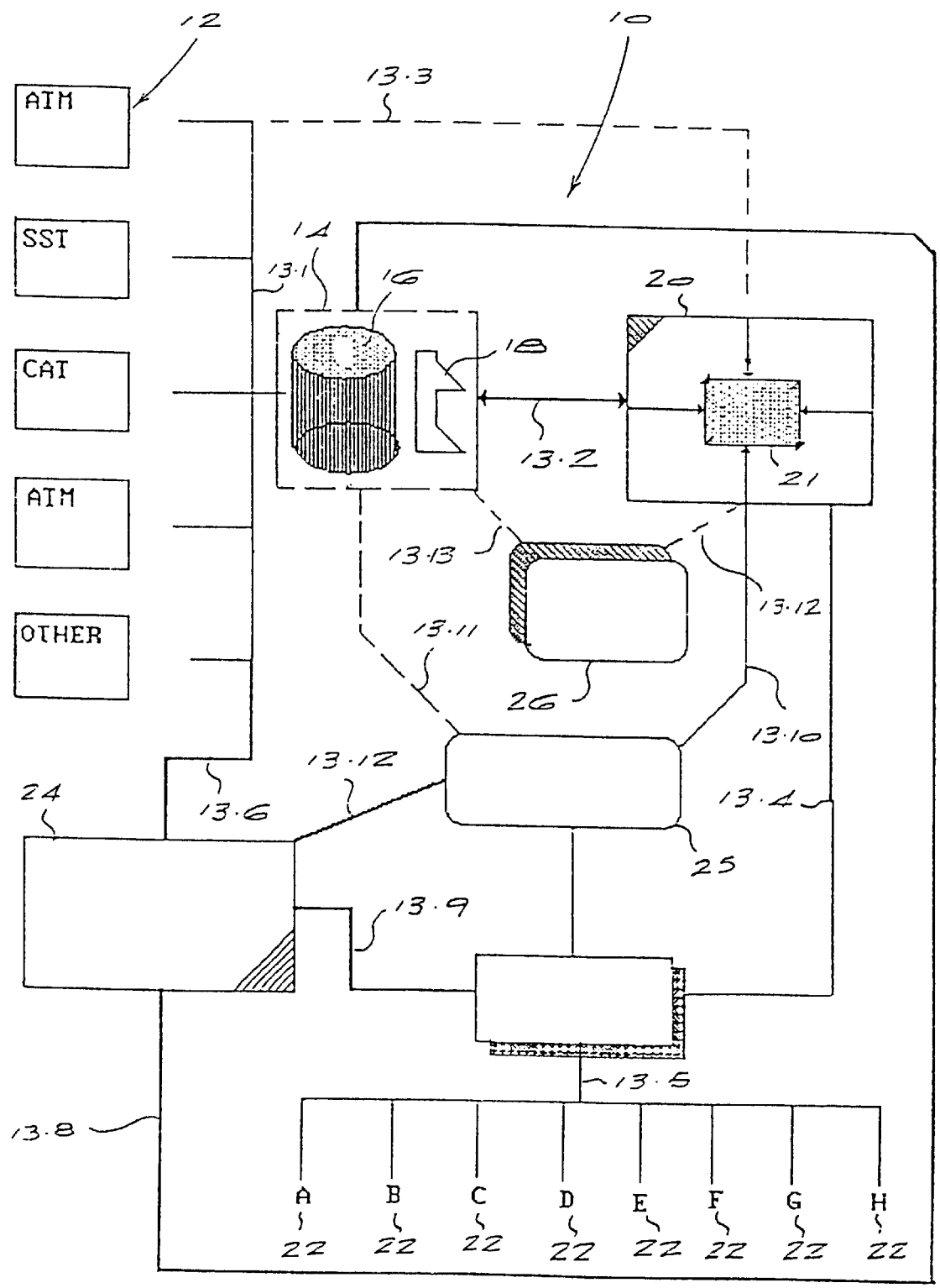
FIG. 1 is a schematic illustration of a transaction system according to the invention for conducting a transaction between a vendor and a purchaser.

Turning now to more detailed FIG. 1, a transaction system 10 for conducting a transaction between a vendor and a purchaser comprises one or more ATM's 12 of a particular bank XYZ. The ATM's 12 of the XYZ bank are linked via communication line 13.1 to a data processing system 14, which includes an ATM controller, located at a computer centre of the XYZ bank. Transactions that are conducted at the ATM 12 by a purchaser who holds an account at the XYZ bank are communicated directly to the data processing system 14 via the communication line 13.1. The data processing system 14 of the bank includes data storage means 16, and interface means 18 for allowing communication of the data processing system 14 with an ATM network 20 via a communication link 13.2.

In the event that a purchaser does not hold an account at the XYZ bank, transaction details are communicated via the communication line 13.3, or via the data processing system 14 and communication lines 13.1 and 13.2, to the ATM network 20 which then relays these details to the computer centre of the relevant bank.

The ATM network 20 includes an ATM switch or interchange 21 and provides communication between ATM's, point-of-sale (POS) devices, bank branches, and the computer centres of the banks which are linked into the network. ATM networks currently operational in South Africa include the SASWITCH and MULTINET networks. The computer centres 22 of a plurality of other banks A to H are linked to the ATM network 20 via the communication link 13.4. The computer centre 22 of each bank is then of course accessible by all branches of that bank either by way of a dedicated communication line or via the ATM network 20.

A vendor database 24 is linked into the transaction system 10 in a number of ways. Firstly, the vendor database 24 is directly linked to at least one ATM 12 via a communication link 13.6. Secondly, the vendor database 24 is linked to the data processing system 14 of the XYZ bank via communication link 13.8, and to the computer centres of other banks 22 via a communication link 13.9. Finally, the vendor database 24 may optionally be linked to a central vendor controller 25, which serves to consolidate and control the inputs from a number of vendor databases 24. The central vendor controller 25 is then linked into the ATM network 20 via communication link 13.10, or directly into the data processing system 14 of the XYZ bank via communication link 13.11.

An independent vendor product information updating system 26, such as Beltel or Computicket, is linked into the ATM network 20 or the data processing system 14 via communication links 13.12 and 13.13 respectively. Alternatively, the updating system 26 could be linked directly to an ATM. In certain applications, the vendor product information updating function may be undertaken by the vendor database 24 directly, in which case the updating system 26 would be redundant. Furthermore, the central vending controller 24 could be dispensed with, and a plurality of vendor databases 22 could be linked directly into the ATM network 20 or to the data processing system 14 of the XYZ bank.

The communication links between the various components of the transaction system 10 are of course bidirectional, and may comprise direct or dial-up telephone lines, or a dedicated communication line. The various components of the transaction system 10 are each provided with interface means, which allows a particular component to communicate with any of the other components of the transaction system 10 using established ATM message protocols.

The transaction system 10 includes system software which facilitates communication between the various components of the system 10, and includes menu drivers for producing menus on display means, such as a cathode ray tube (CRT) incorporated into the ATM. The system software also includes software for producing and storing transaction records, and updating product-related information that is displayed at the ATM. The system software may be stored in storage means, such as a hard disc, CD-ROM, random access memory (RAM) integrated circuit, read only memory (ROM) integrated circuit or a tape provided at either the ATM 12, the data processing system 14 of the computer centre, the ATM network 20, or the vendor database 24. Of course, the entire system software need not necessarily be stored exclusively at any one of the above listed locations, in which case the system software would be configured to interact and communicate to ensure the desired functioning of the transaction system 10.

The system software, or part thereof, and transaction-related information could also be stored on portable storage means which is carried by a purchaser, and which allows the purchaser to utilise the transaction system 10. Such portable storage means could be a card having memory means, such as a "smart card", or a simple 3½" or 5¼" computer diskette. The purchaser would then insert the portable storage device into an appropriate reader provided at the ATM to download the system software into the memory of the ATM 12.

It is also envisaged that a clearing house (not shown) will be linked to, or incorporated into, the transaction system 10, by being linked directly into the ATM network 20, or to the data processing system 14 at a computer centre of a bank. The clearing house would be accessed by the transaction system 10 to verify and authorize certain types of transactions so as to minimise the occurrence of fraud in transactions performed on the system 10.

Figure 2:
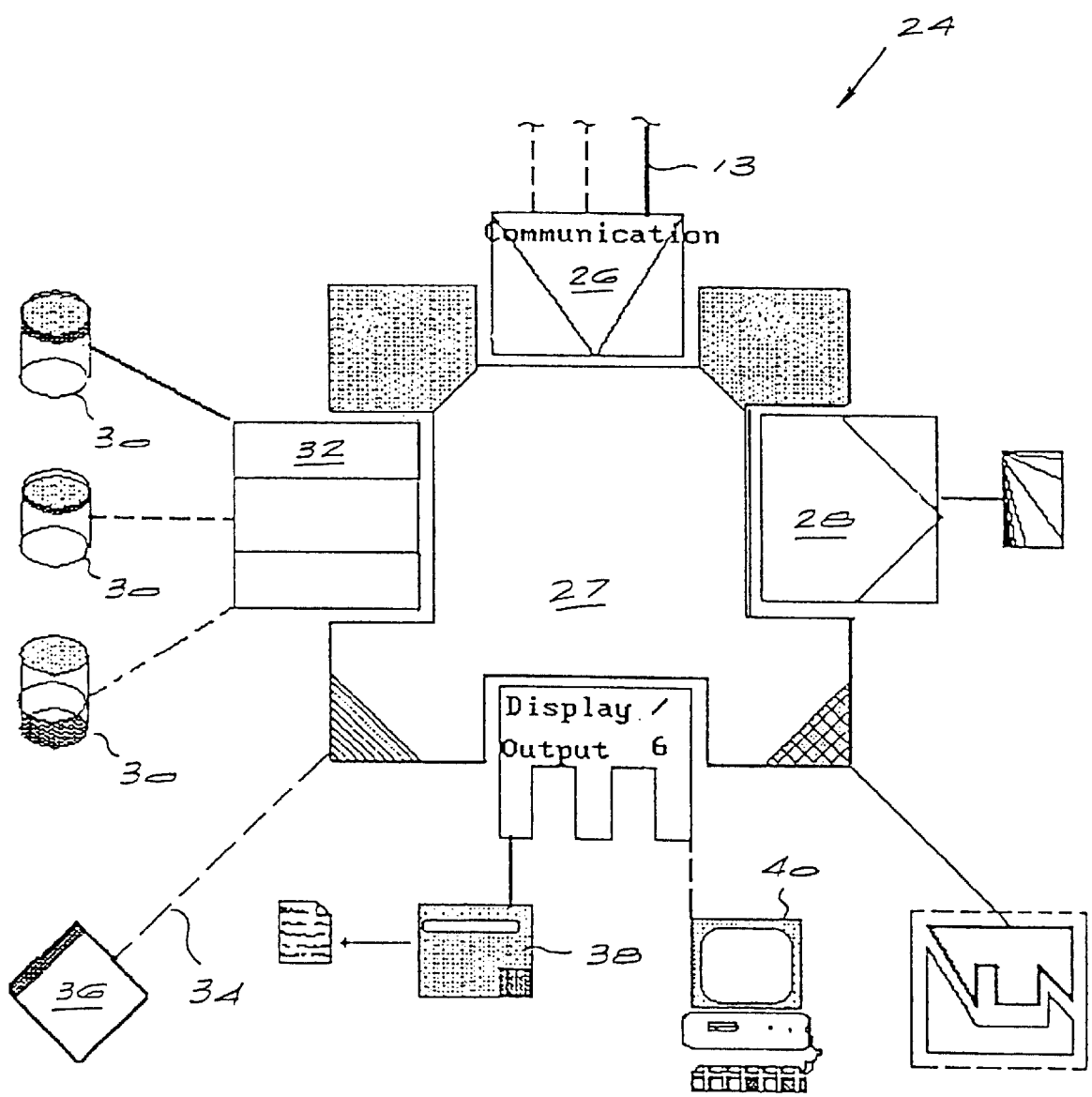
FIG. 2 is a schematic illustration of a vendor database provided by a vendor and which constitutes part of the transaction system of FIG. 1.

FIG. 2 shows an example of a vendor database 24, which may comprise a central processing unit (CPU) 27, a communication interface 26 which communicates via communication links 13 with the other components of the transaction system 10. A plurality of databases 30 are linked to the CPU 27 via a data base controller 32. The databases 30 are typically client, product and fund management databases, to name but a few. The product and client databases 30 are updatable with transaction-related information received from the ATM at the successful conclusion of a transaction. The vendor database 24 is linked via a communication link 34 to an external information source 36 which provides information to the vendor database 24 for updating the databases 30. A printer 38 and a CRT 40 are also included in the vendor database 24.

Figure 3:
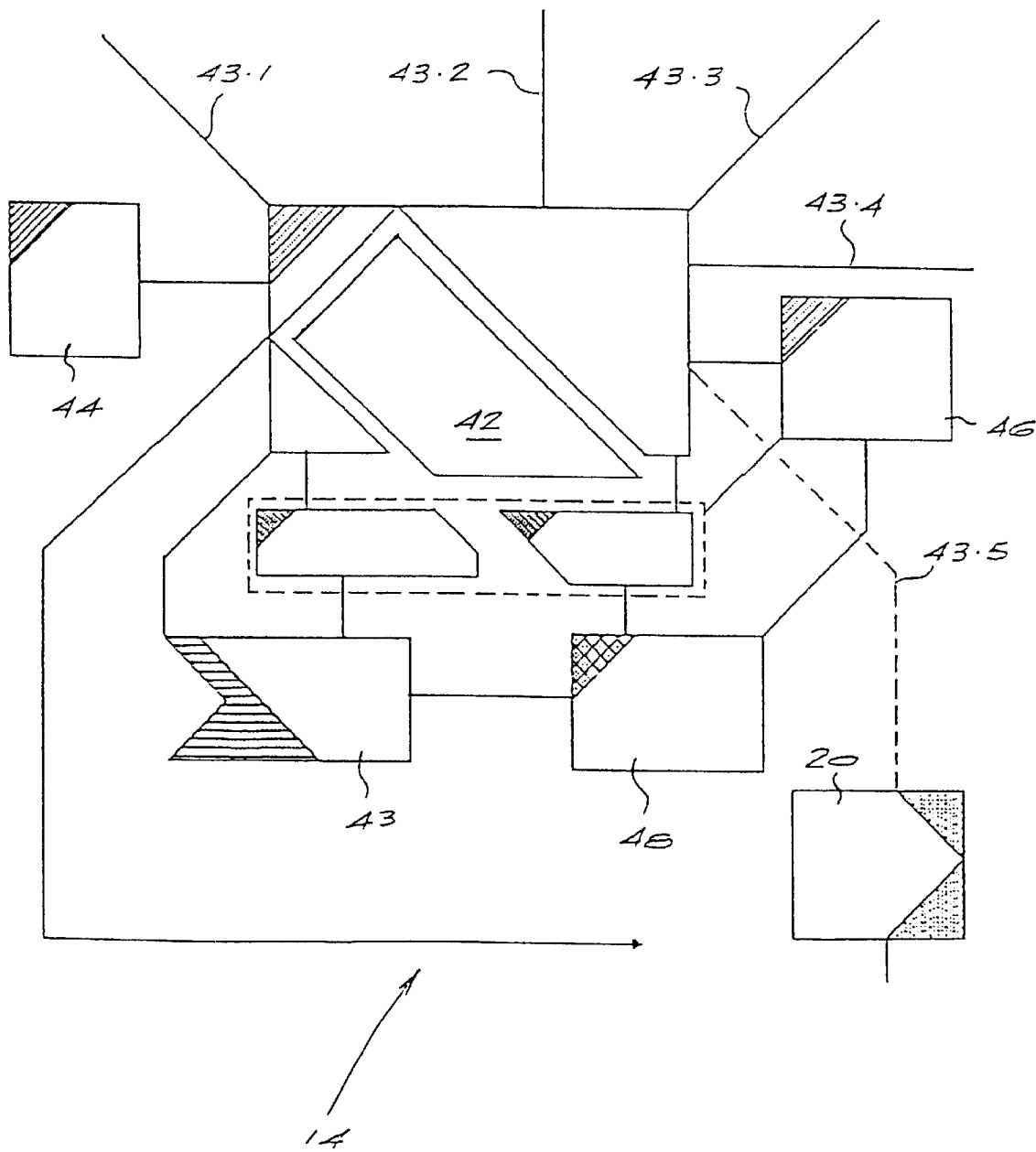
FIG. 3 is a schematic illustration of a data processing system at a computer centre of a bank, the data processing system forming part of the transaction system of FIG. 1.

Referring to FIG. 3, there is shown the data processing system 14 of the computer centre of the XYZ Bank. The data processing system 14 comprises a central processing unit (CPU) 42 which is connected by communication links 43.1 to 43.4 to external units such as point-of-sale devices, ATM groups and bank branches. The CPU 42 is further connected to storage means 43 and a number of external databases 44. The CPU 42 is also connected to the ATM network 20 via the communication link 43.5. Data updating facilities 46 and modus function facilities 48, for performing functions such as data compression, may also be linked to the CPU 42.

Figure 4:
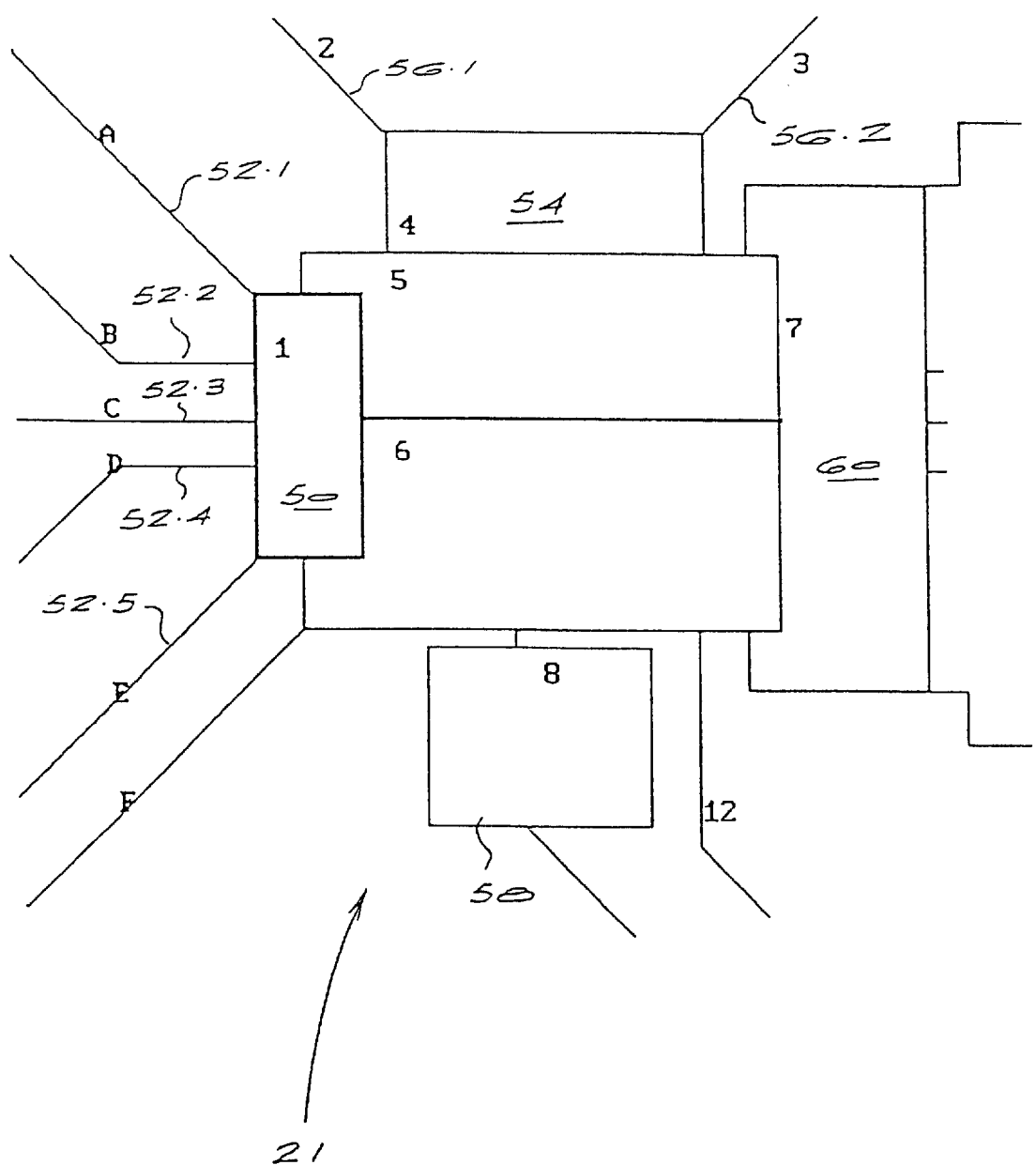
FIG. 4 is a schematic illustration of an ATM interchange which forms part of the transaction system of FIG. 1.

FIG. 4 shows a more detailed schematic representation of the ATM switch or interchange 21. The interchange 21 includes a bank interface unit 50 for providing communication links 52.1 to 52.5 with various banks or bank branches. A point-of-sale (POS) interface allows the interchanger 21 to communicate via communication links 56.1 and 56.2 with various point-of-sale devices. The interchange 21 is also provided with storage means 58 for storing, for example, a number of databases and software for controlling the functioning of the interchange 21. Finally, a general purpose ATM interface 60 allows a number of other units to be connected and fed into the interchange 21, such as the vendor database 24 and the vendor product information updating system 26.

Figure 5:
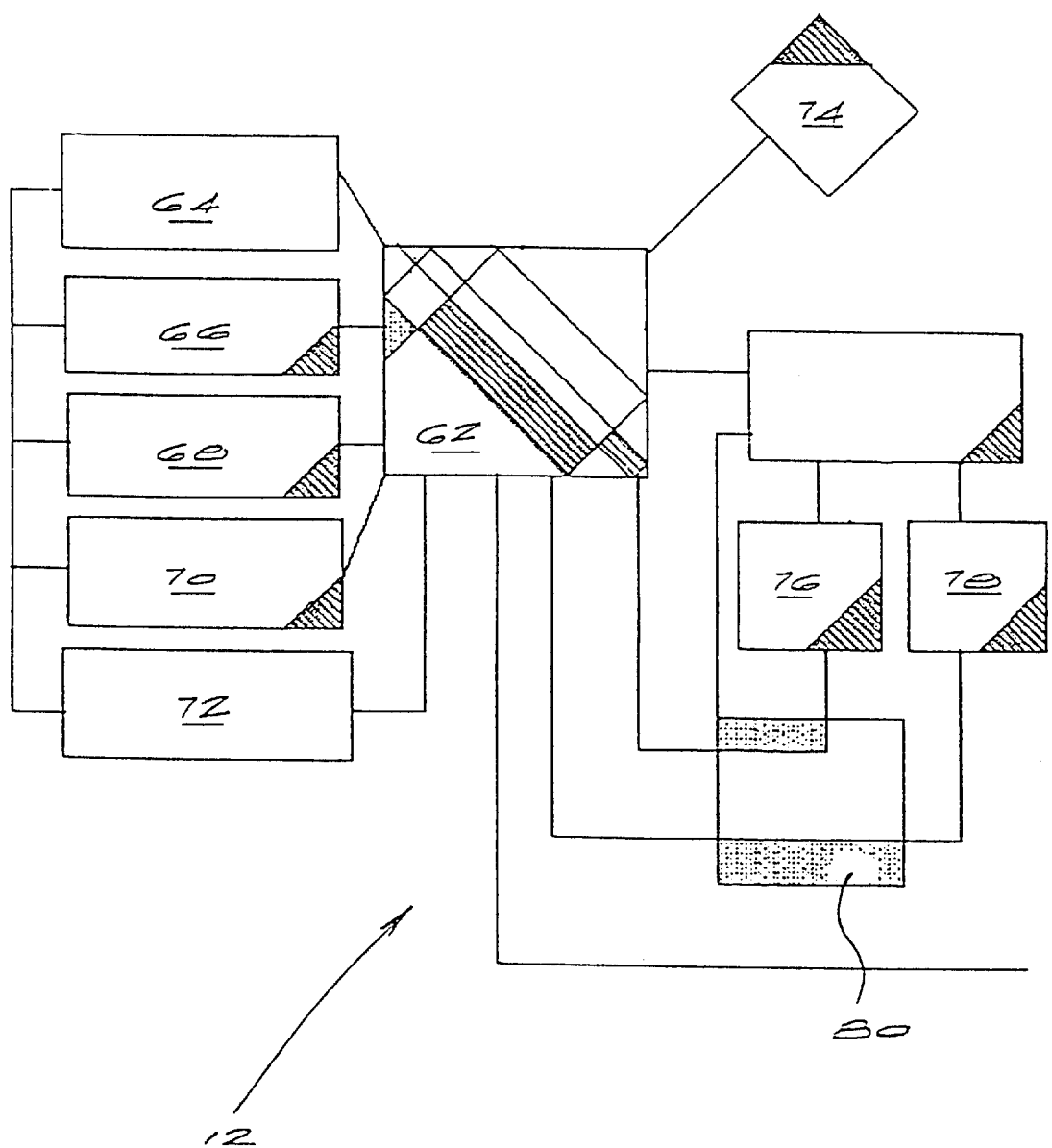
FIG. 5 is a schematic illustration of components of an ATM which constitute part of the transaction system of FIG. 1.

In FIG. 5, the basic components of an automatic teller machine (ATM) 12 are schematically depicted. A CPU 62 is connected to display means in the form of a CRT 64, first input means in the form of a numeric keypad or touch screen 66, second input means in the form of a card reader 68 which may be a magnetic or optical card reader, a printer 70, and third input means 72 which may be a disk drive or CD-ROM reader. A communications interface 74, which may for example be a dial-up modem or a dedicated tie-line interface, connects the ATM 12 to the data processing system 14 of a bank, or to an ATM network 20. The ATM 12 may furthermore include storage means in the form of a hard disc 76, or a random-access-memory (RAM) integrated circuit 78. The storage means preferably stores at least part of the system software, and in a preferred embodiment, stores menu drivers for generating menus on the CRT 64 so as to allow a purchaser to perform a transaction at the ATM 12. The ATM 12 may also be provided with back-up storage means 80.

The function of the transaction system 10 will now be described with reference to FIGS. 6(*a*) to FIG. 16(*b*). The primary function of the transaction system 10 is to allow an ATM purchaser to perform a transaction, be it a financial or information transaction, with a vendor at any ATM which forms part of the transaction system 10. Such transactions could include placing a bet on a horse race via a totaliser, purchasing shares through a stock broker, purchasing unit trusts, buying tickets for the theatre or a motion picture performance, buying tickets for a sports event, buying travel tickets, purchasing futures options, purchasing insurance and purchasing lottery tickets or other indicia.

To enable an ATM purchaser to conduct a transaction, the system software, which may be stored on any one or more of the components of the transaction system 10, includes menu drivers for producing enquiry menus through which the purchaser is systematically interrogated regarding various transaction options so as to allow the transaction system 10 to glean the transaction-related information from the purchaser required to perform the transaction. The transaction-related information is then transmitted to the vendor database, which then stores this information so that the vendor database has knowledge and records of the transaction.

The implementation of the enquiry menus can be achieved in a number of ways which are discussed below.

Irrespective of the menu format, the interrogation and verification procedures embodied in the system software remain the same. Examples of interrogation and verification procedures that could be embodied in the system software are graphically illustrated by the flow charts of FIGS. 6(*a*) to FIGS. 6(*c*). The interrogation and verification procedure illustrated in FIG. 6(*a*) commences with a transaction initiation request which requires the purchaser to insert his or her ATM card into the card reader 68 of the ATM. Once the card has been inserted into the slot, the transaction system 10 will confirm that the transaction is authorized by requesting the purchaser to enter an access code, or personal identification number (PIN). Once the PIN has been verified, the purchaser is requested to select a service to be accessed. The purchaser then completes a selection procedure which involves choosing between a predetermined number of transaction options. After the selection of at least some of the transaction options, the system software will perform a number of checks to determine whether the selection is valid before proceeding to present further transaction options. Once the various transaction options of a transaction have been selected the transaction will be confirmed, the transaction-related information will be transmitted to the vendor database for updating purposes and the purchaser is free to perform a further transaction if required.

Figure 6A:
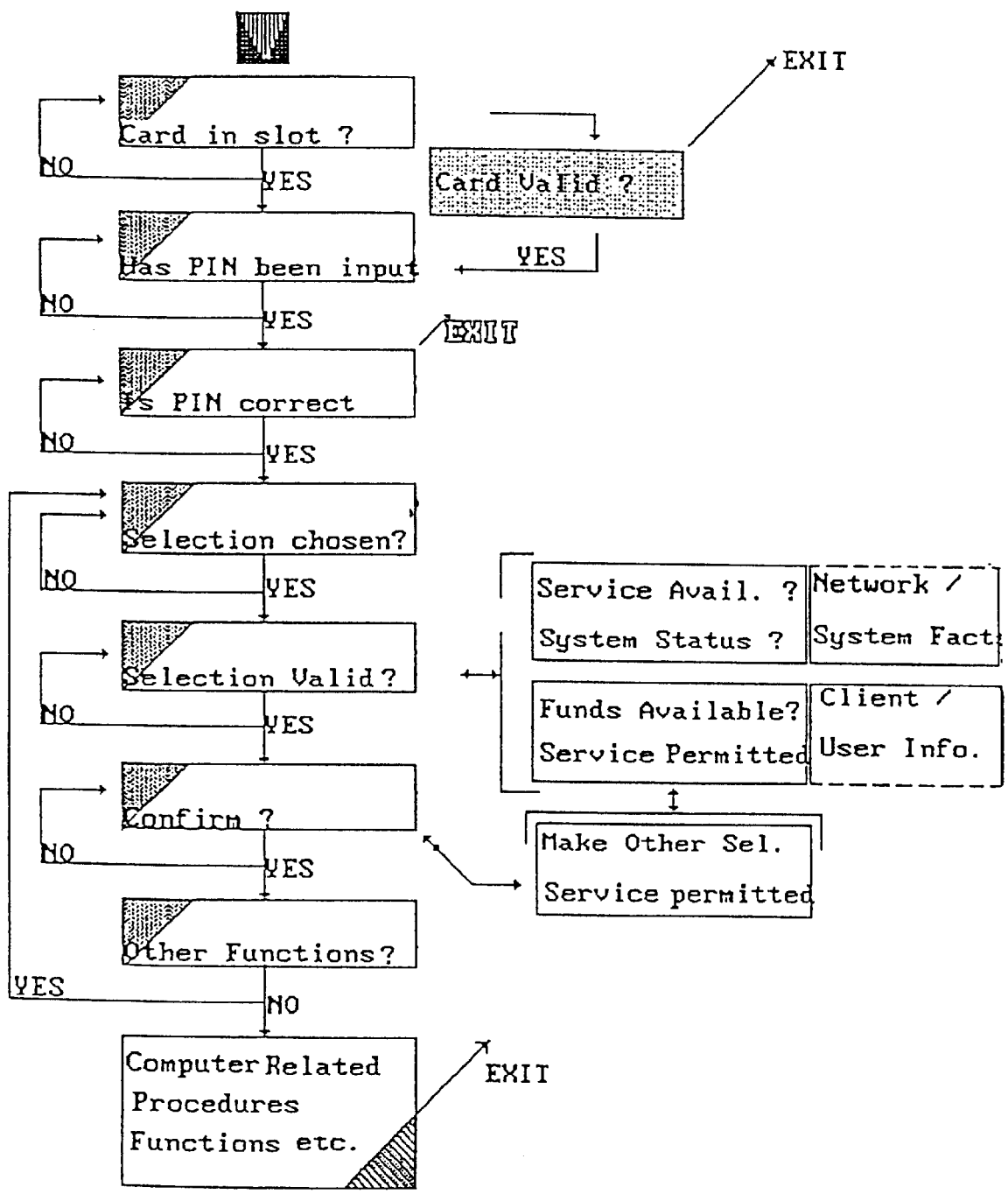
FIGS. 6(a) to (c) are flow diagrams depicting interrogation and verification procedures incorporated in system software of the transaction system of FIG. 1.
Figure 6B:
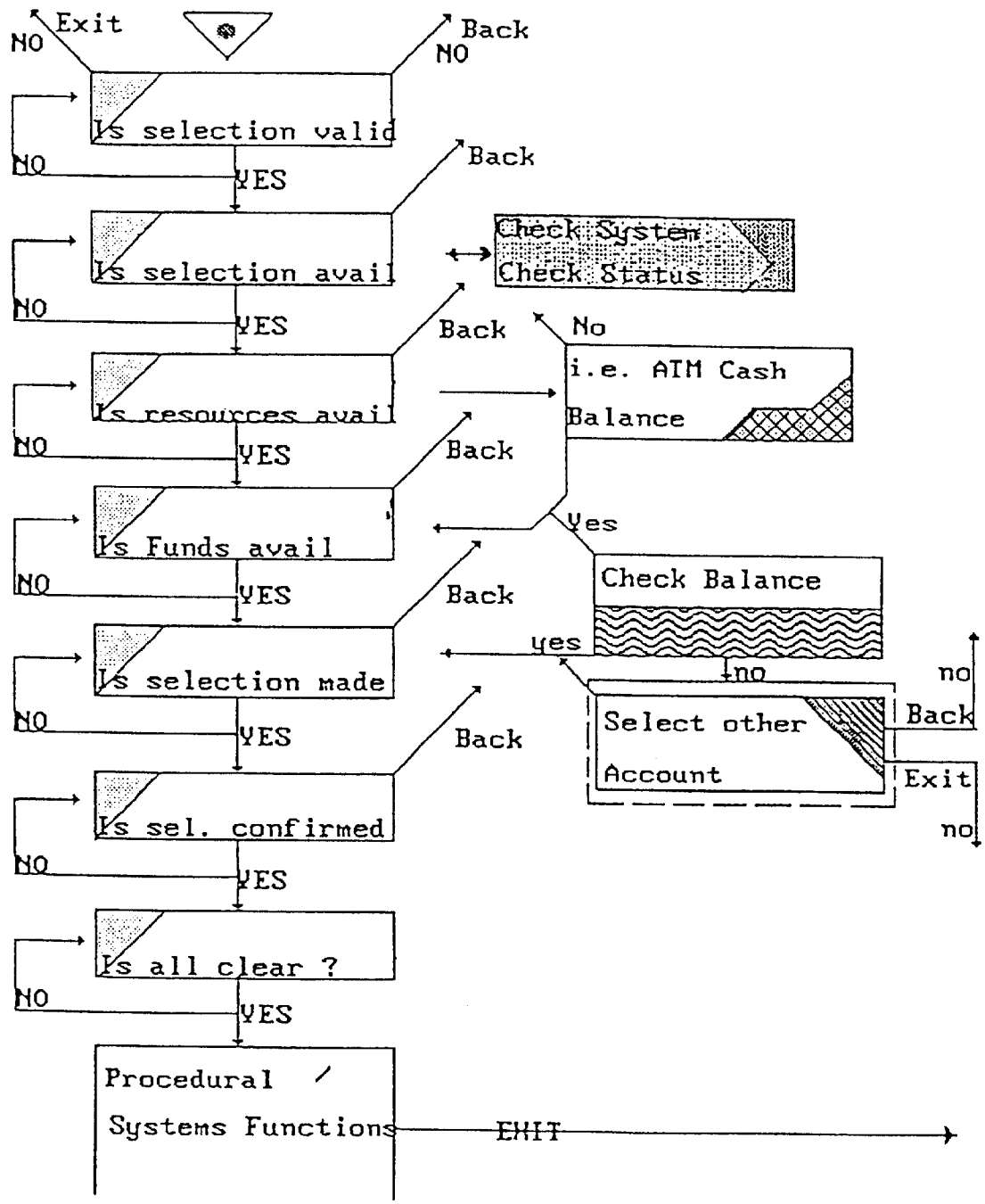
Figure 6C:
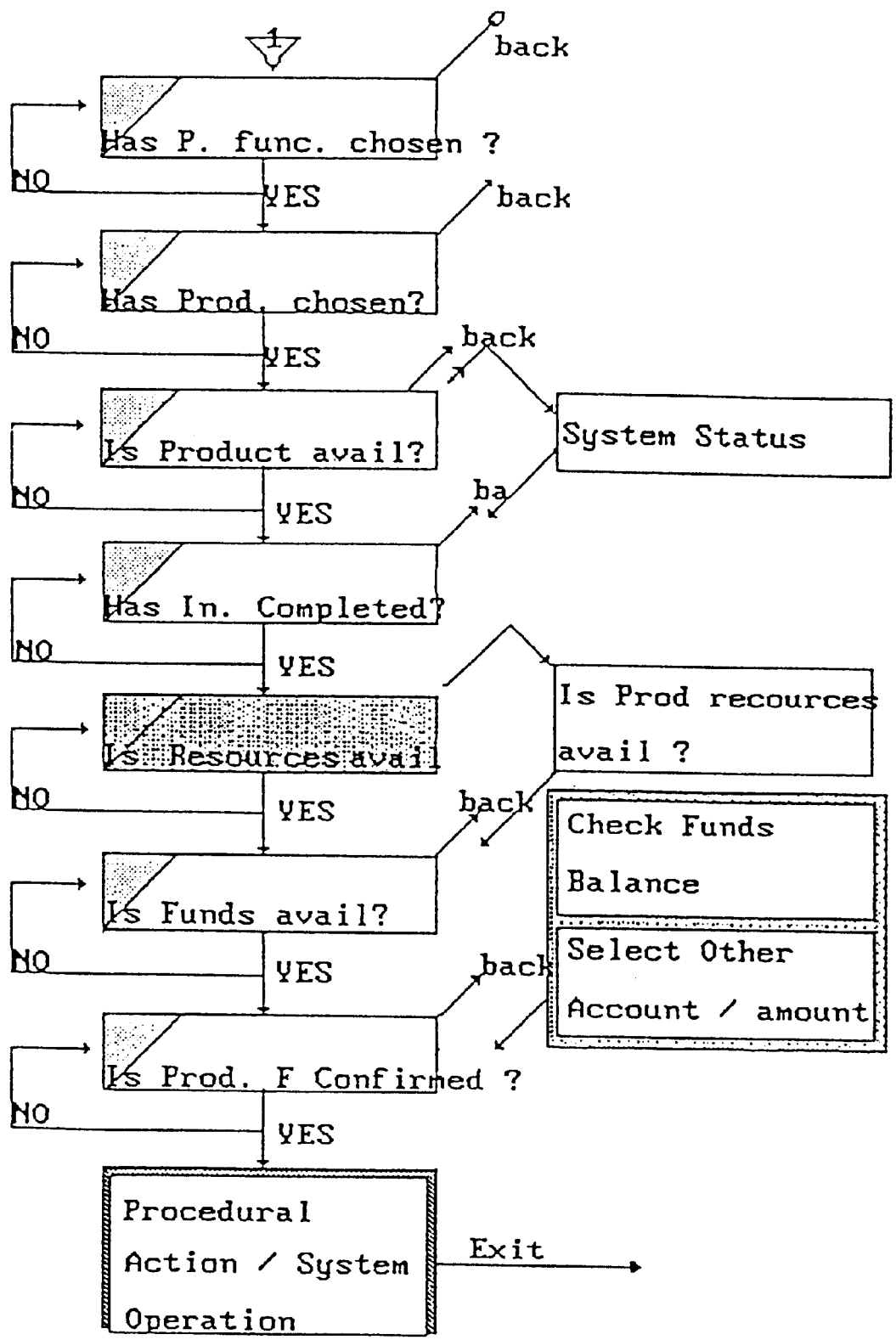

FIGS. 6(b) and FIGS. 6(c) illustrate examples of procedures that fall under the "SELECTION VALID?" procedure which is shown in FIG. 6(a). This "SELECTION VALID?" procedure involves conducting checks to ensure that the transaction options selected by a purchaser are valid and can be fulfilled. For example, FIG. 6(b) shows a check procedure conducted by the system software when a purchaser specifies a certain transaction value. The check procedure will then proceed to verify that an account selected by the purchaser from which funds are to be transferred in fact contains sufficient funds for the completion of the transaction. Should the selected account, for example a current account, not have sufficient funds, the purchaser may then optionally select another account, such as a credit card account, from which the funds should be transferred. Should it transpire that the purchaser possesses insufficient funds in his or her accounts to complete the transaction, the system software will abort the interrogation verification procedure.

FIG. 6(c) shows a check procedure conducted by the system software to ensure that a product which forms the subject of a transaction is in fact available. For example, when purchasing tickets for a theatre or sports event, the seats that the purchaser wishes to book may already have been sold to a customer via another ATM, or for example by Computicket. Alternatively the stocks of a certain product may have been depleted, or the response time for a contract may have expired, in which case the product will not be available. In these scenarios, the system software will either ask the purchaser to exercise an alternate transaction option, or will abort the interrogation and verification procedure depicted in FIG. 6(a).

Information as to whether a product is available is supplied to the system software via the vendor product information updating system 26 shown in FIG. 1, or by the vendor database 24 itself.

It is also envisaged that the "SELECTION VALID?" procedure may include other check procedures which, for example, may prohibit a purchaser from performing a certain transaction if he or she is below a certain age, or is disqualified on some other ground from performing the transaction. A purchaser under the age of 21 can in this way be prohibited by a check procedure from purchasing shares from a vendor database 24 linked to a Stock Exchange. This check procedure can also be used to prevent the sale of motion picture tickets for an age-restricted motion picture to an under-aged purchaser.

If it transpires that a purchaser does not have sufficient funds in any of his or her accounts, the purchaser may be given the option of obtaining credit facilities. To establish whether the purchaser qualifies for credit facilities, and if so, the value of credit facilities, the system software may perform a credit evaluation by analysing data obtained from the purchaser's financial institution, credit organisations or a vendor database. The credit facilities are then given to the purchaser either by extending the credit limit on an existing account held by the purchaser, or by opening a new account, having credit facilities, in the name of the purchaser.

The interrogation procedures embodied in the system software are realised through menu drivers incorporated into the system software and which produce a plurality of menus, which are displayed on the CRT or screen 64 of an ATM. The system software incorporating the menu drivers is preferably stored on the hard drive 76 of an ATM, but could alternatively be stored in any of the other components of the transaction system 10, such as the ATM interchange or the vendor database 24.

Figure 7:
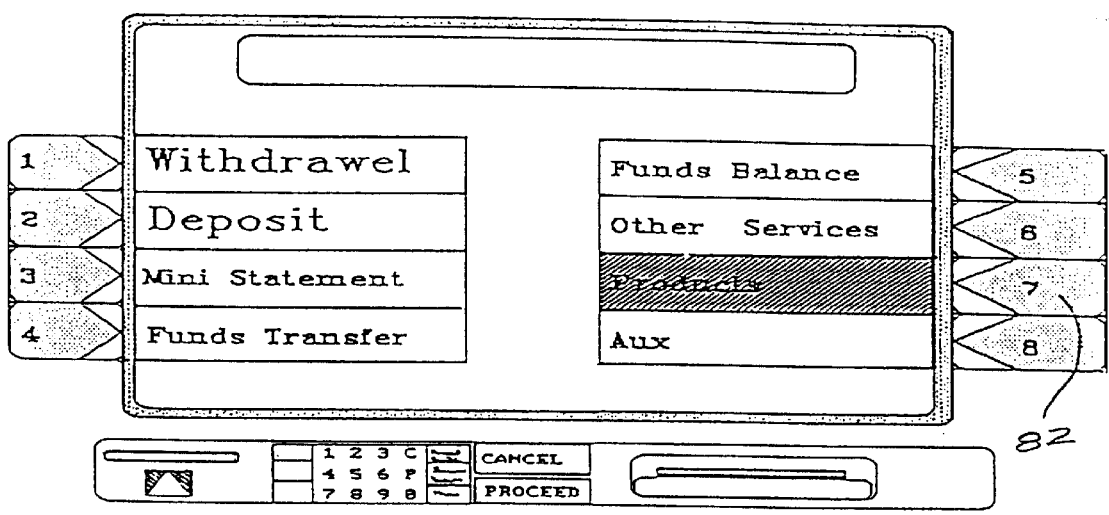
FIG. 7 is an illustration of a basic function enquiry screen which is displayed on the ATM depicted in FIG. 5.

A number of the menus produced by the system software will now be described merely for illustrative purposes. The first two menus generated by the system are standard menus that currently appear on a number of ATM's, the first menu inviting a purchaser to insert a magnetic-strip card into the card reader 68 of the ATM. Once a purchaser's card has been read by the card reader 68, a second menu will request the purchaser to enter his or her personal identification number (PIN). Optionally, the purchaser may requested to enter a second access to increase the security of the system. Assuming that access is granted to the purchaser, the menu shown in FIG. 7 will appear on the ATM screen 64. This menu basically corresponds to menus that currently are available on ATM's, but differs in that an extra option is provided, namely the "PRODUCTS" option which is shaded. If only one type of product transaction can be conducted from the ATM 12, the "PRODUCTS" option may be replaced by a more specific product option, such as for example "SHARES", which option will allow the purchaser to purchase only shares.

Figure 8:
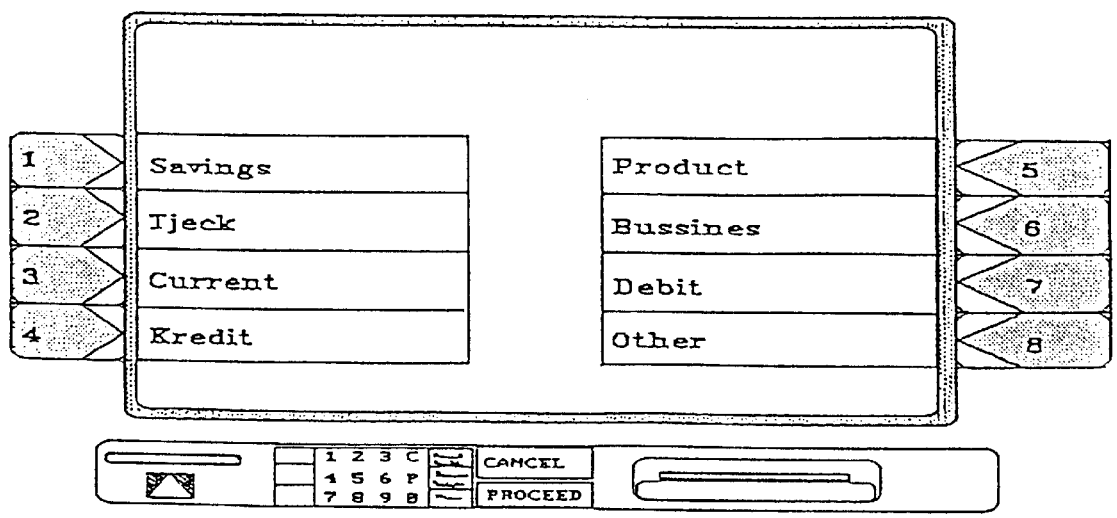
FIG. 8 is an illustration of an account enquiry screen which is displayed on the ATM.
Figure 9:
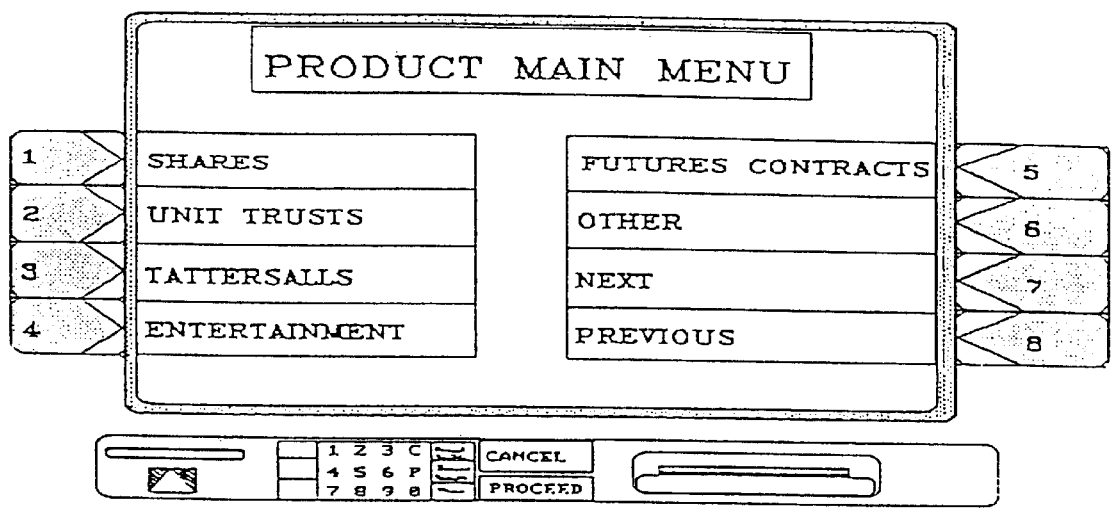
FIG. 9 is an illustration of a product main menu screen which is displayed on the ATM.

Once the purchaser has indicated that he wishes to utilise the "PRODUCTS" option by pressing a key 82 corresponding to this option, the menu illustrated in FIG. 8 will appear. The purchaser must then select an account from which funds are to be transferred to perform the transaction. Having selected an account, the product main menu shown in FIG. 9 will be presented to the purchaser. The product main menu provides the purchaser with a selection of products that can be purchased from a vendor database 24 via the transaction system 10 at the ATM 12. In the illustrated example, the purchaser is presented with the option of purchasing shares, unit trusts, entertainment tickets, futures contracts, or placing a bet at a totaliser.

By way of example, the transaction options presented by menus for placing a bet with a totaliser are shown in FIGS. 10(a) to (h). As is apparent from the illustrated menus, the purchaser can exercise options regarding the following criteria:

1. The province in which the race is to be run;
2. The number of the race;
3. The value of the bet to be placed on the race;
4. The type of bet to be placed; and
5. The number of the horse the purchaser wishes to back.

Figure 10A:
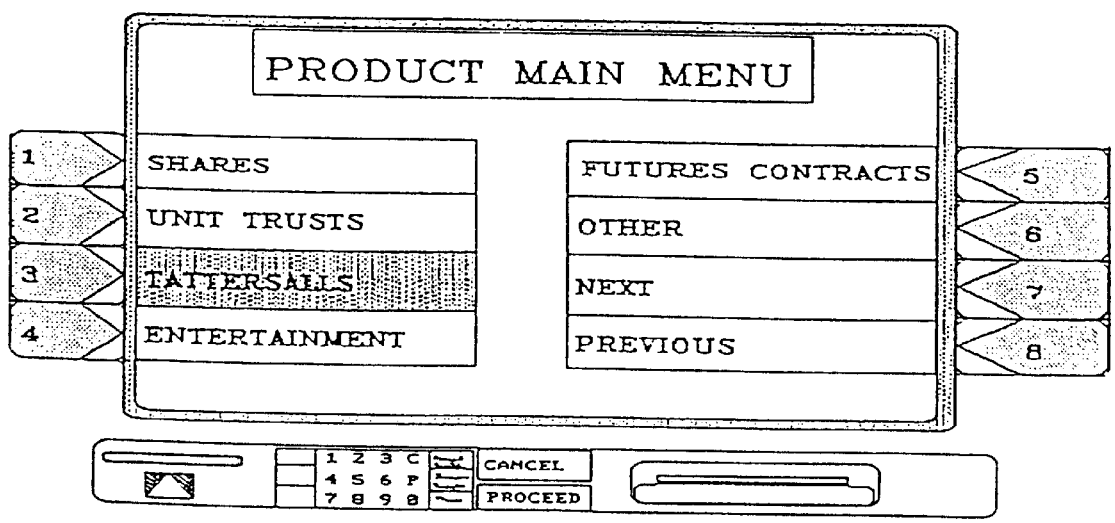
FIGS. 10(a) to (h) show a series of screens displaying menus for exercising transaction options for a betting transaction.
Figure 10B:
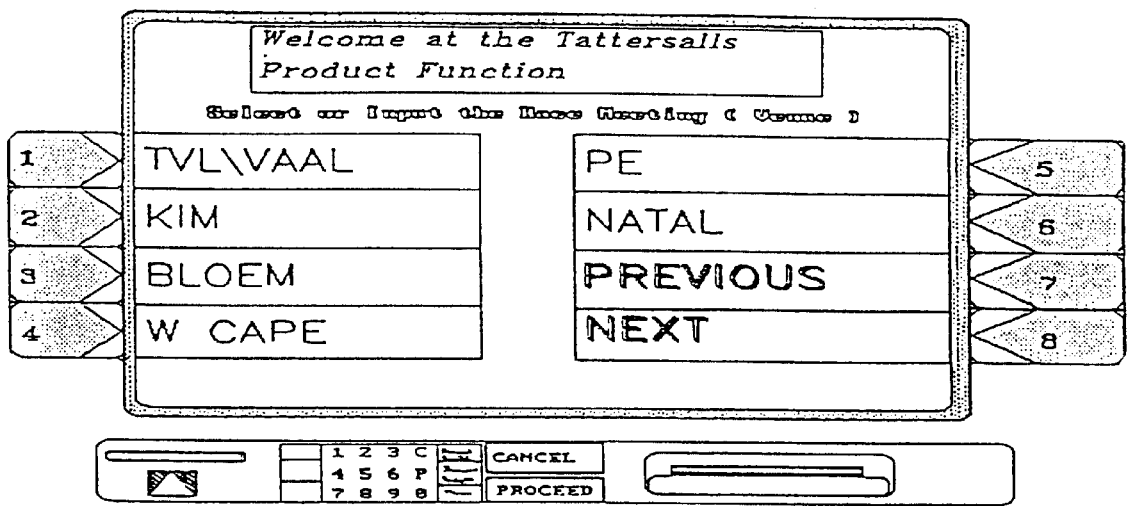
Figure 10C:
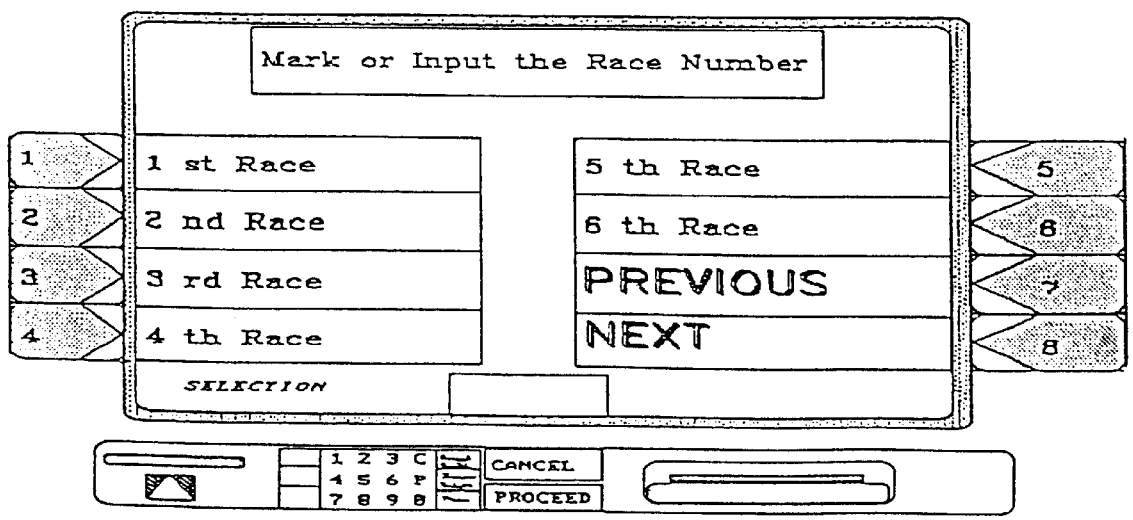
Figure 10D:
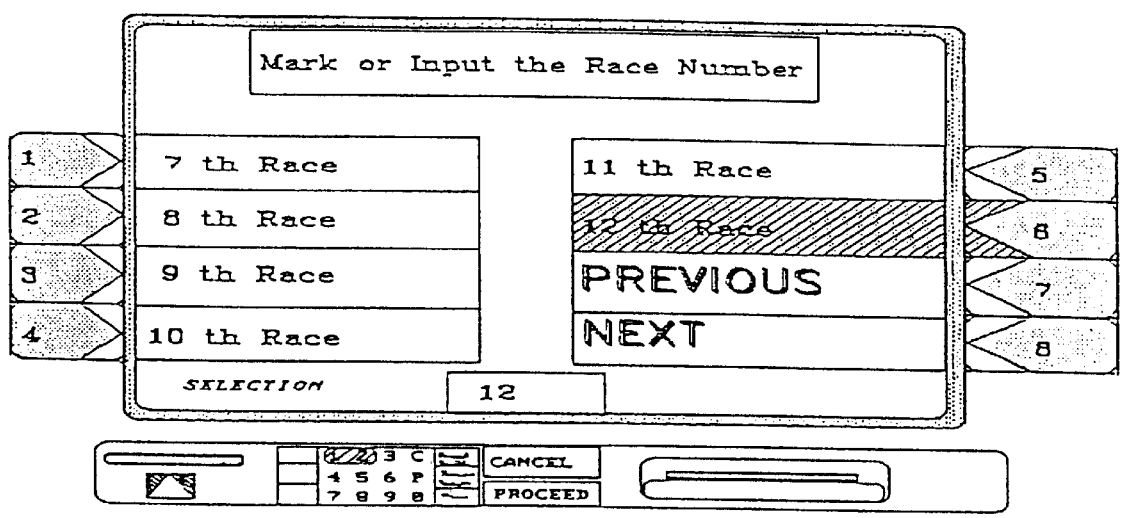
Figure 10E:
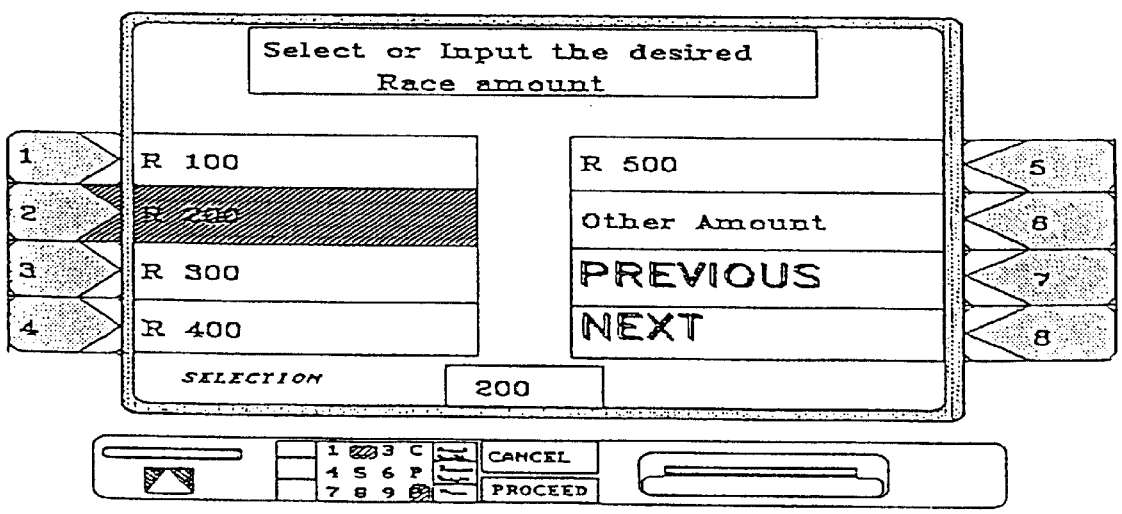
Figure 10F:
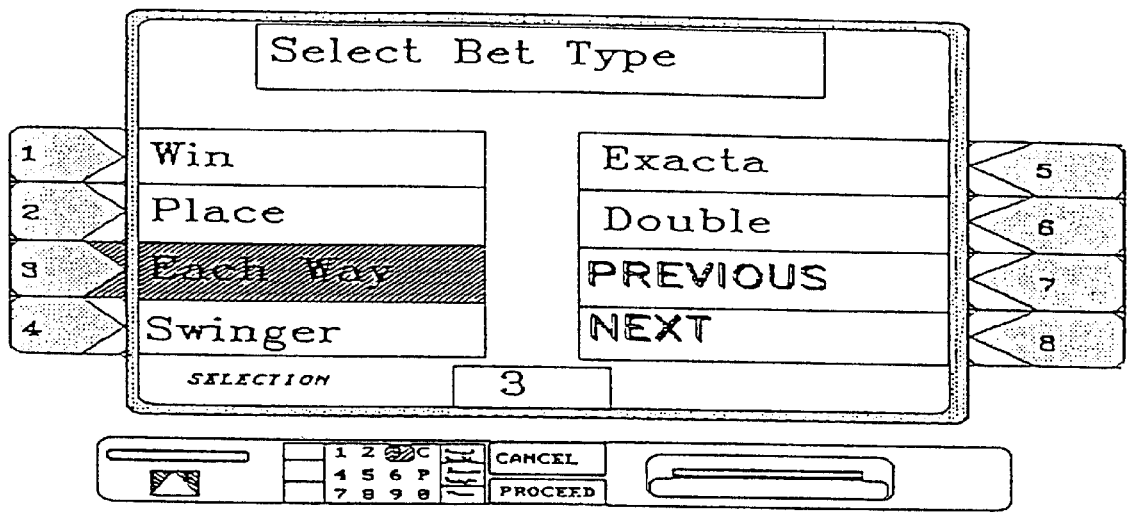
Figure 10G:
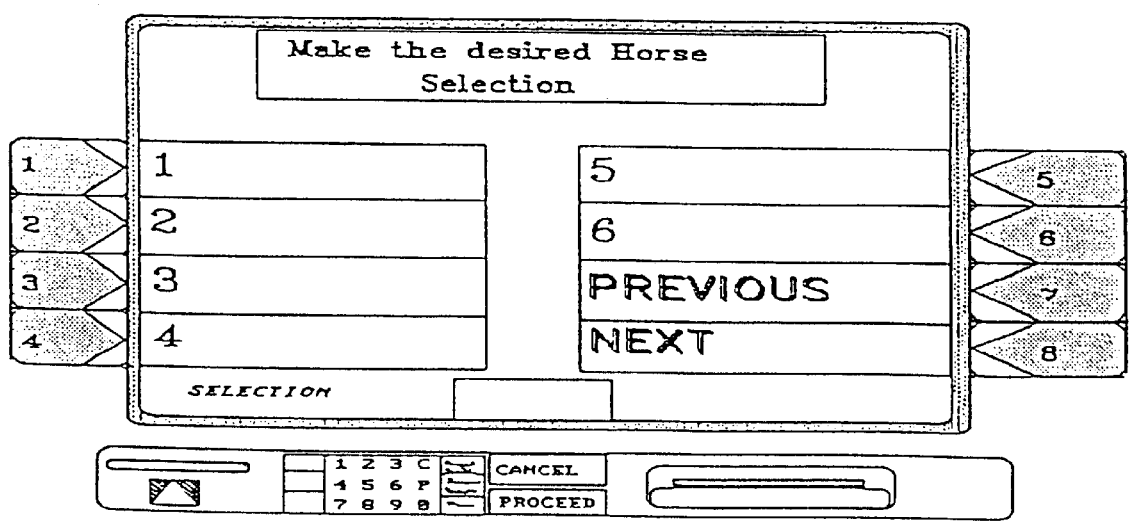
Figure 10H:
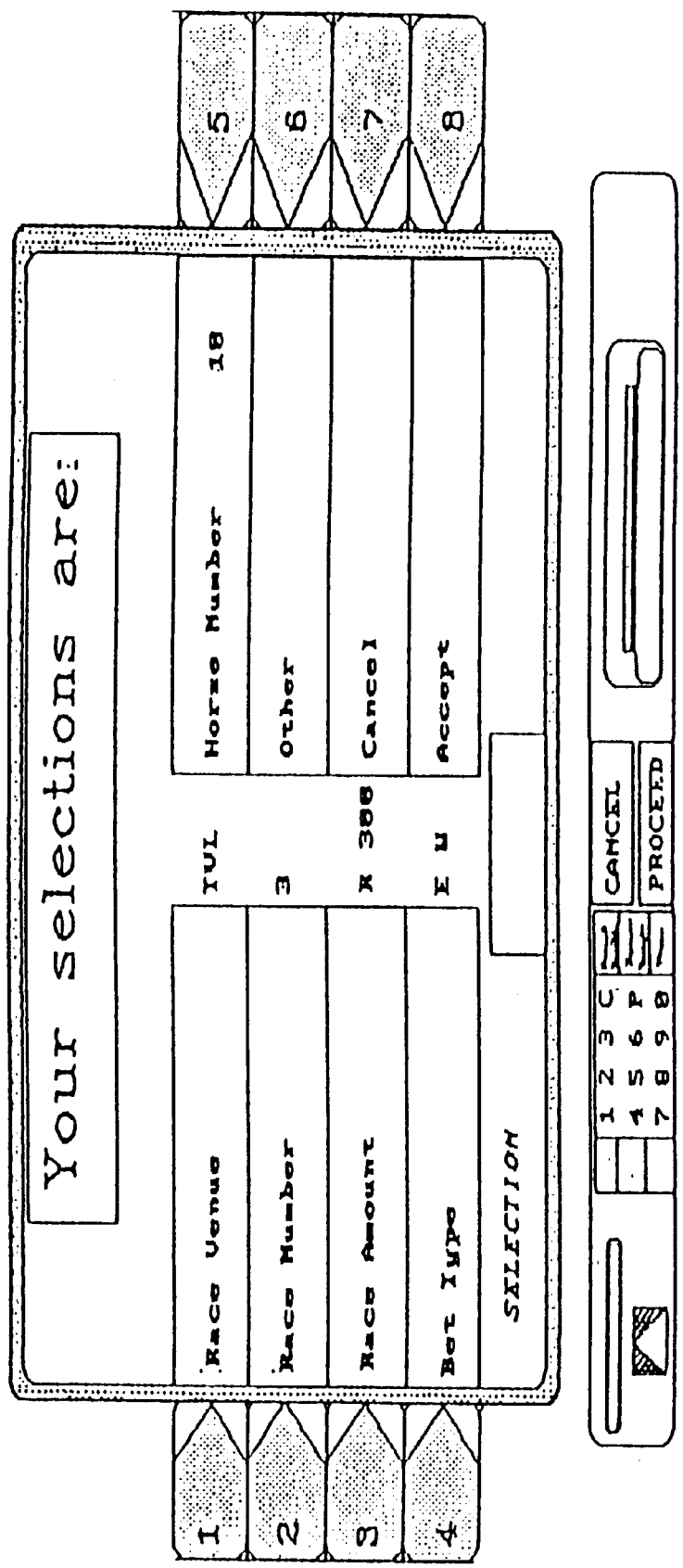
Figure 11A:
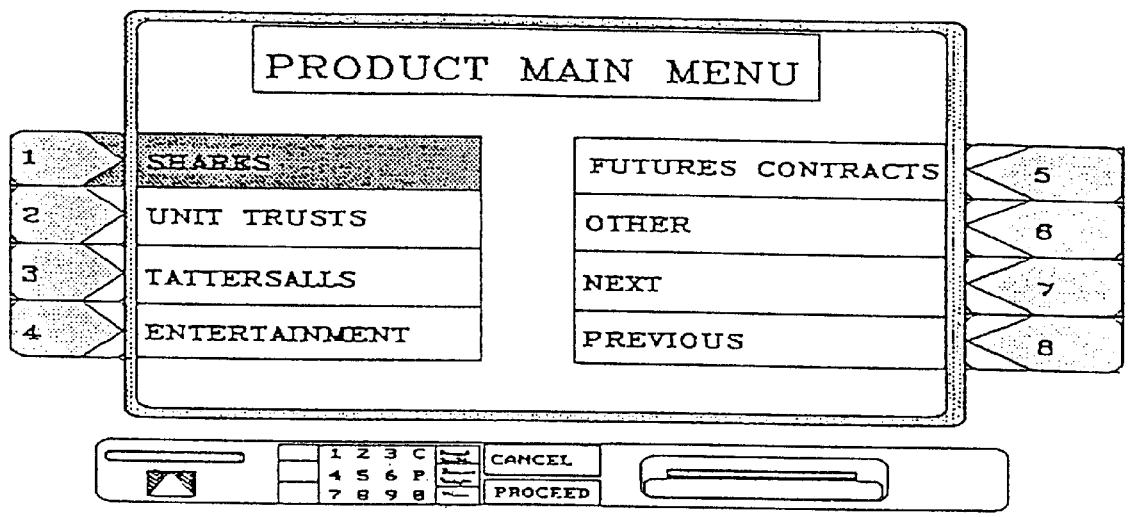
FIGS. 11(a) to (h) show a series of screens displaying menus for exercising transaction options relating to a share purchase transaction.
Figure 11B:
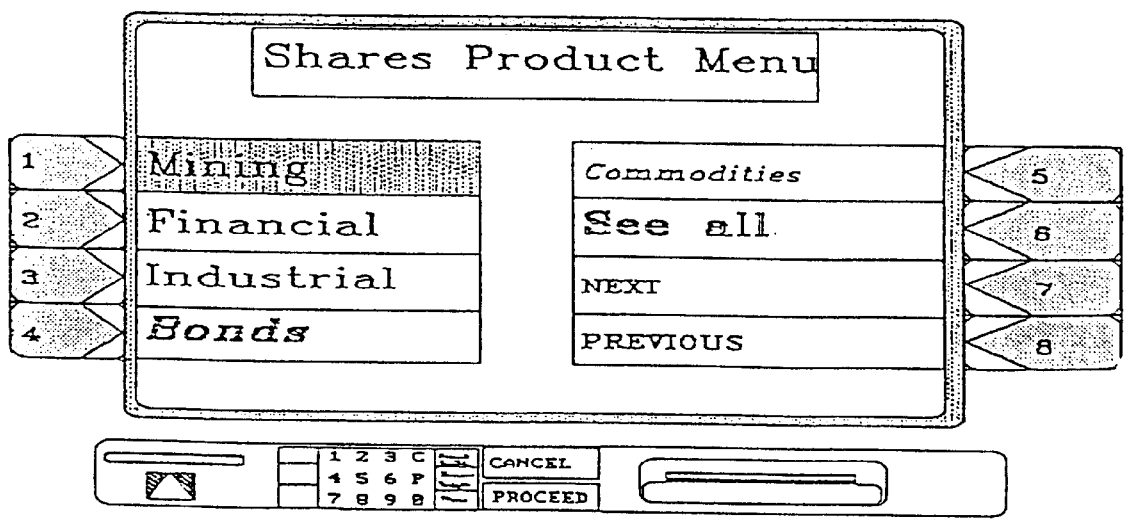
Figure 11C:
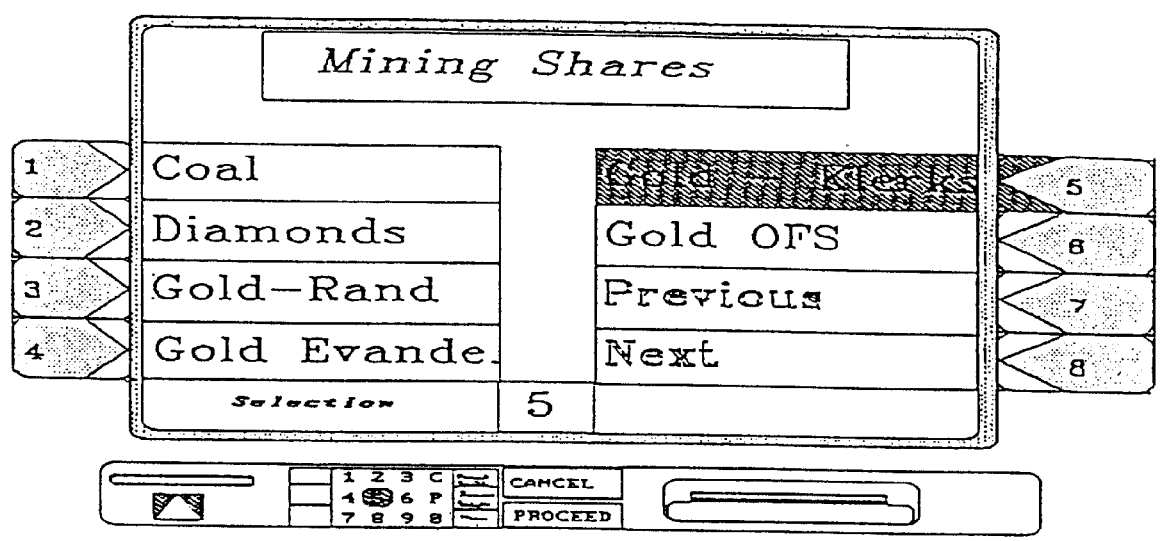
Figure 11D:
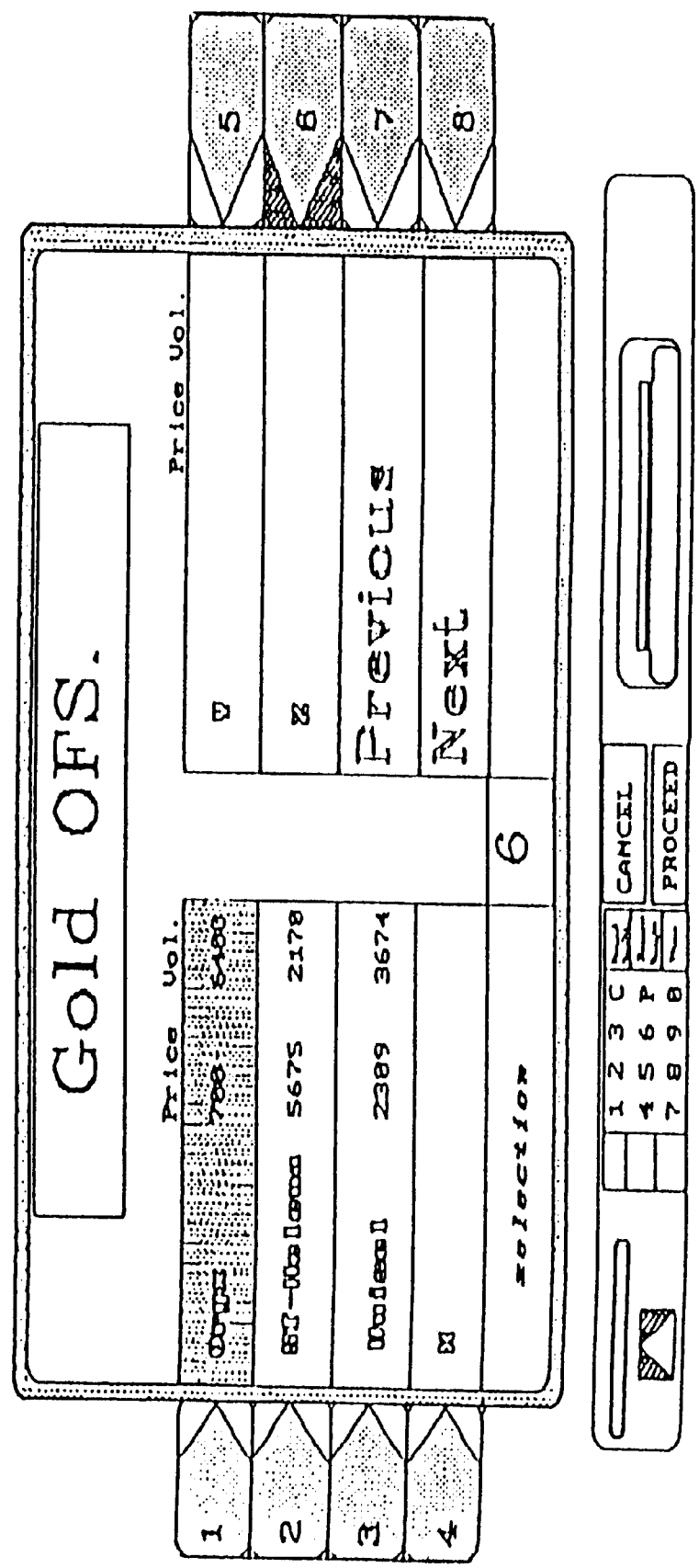
Figure 11E:
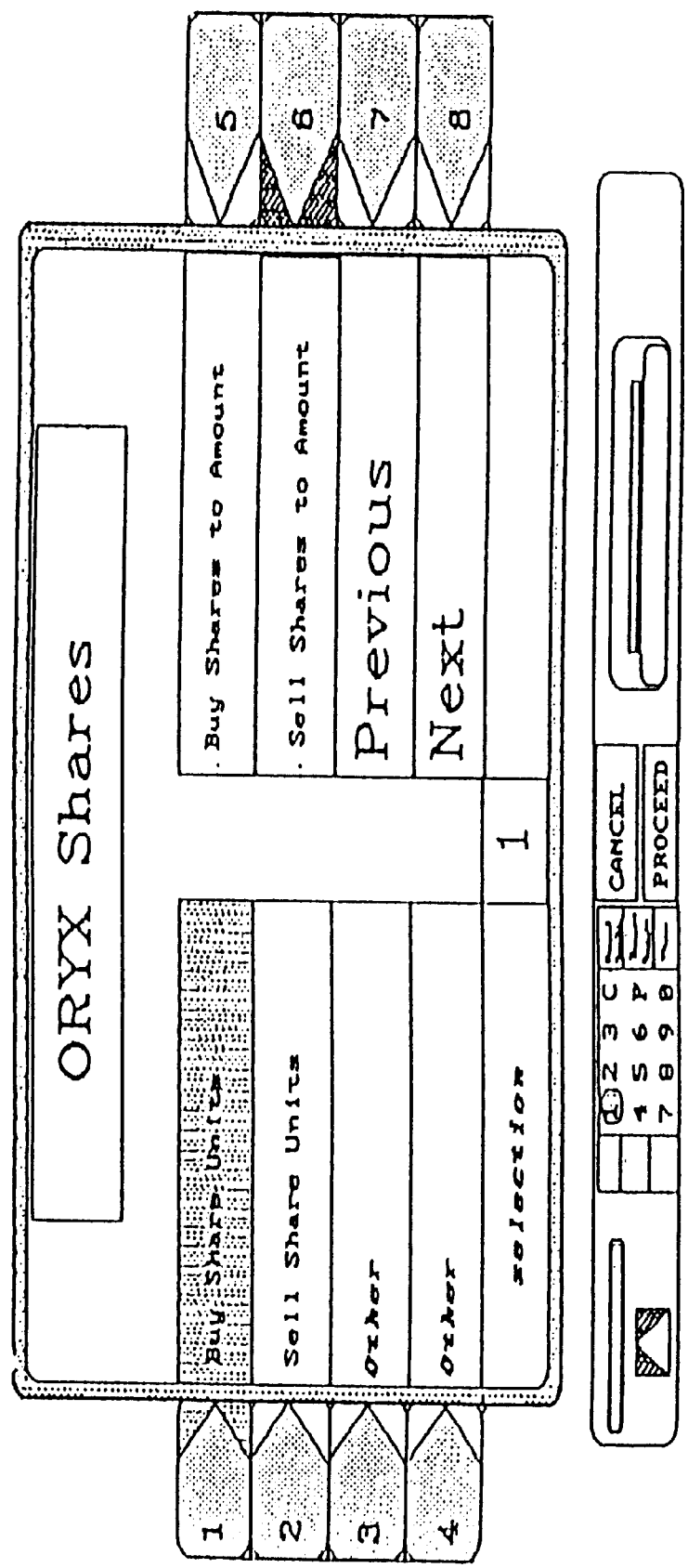
Figure 11F:
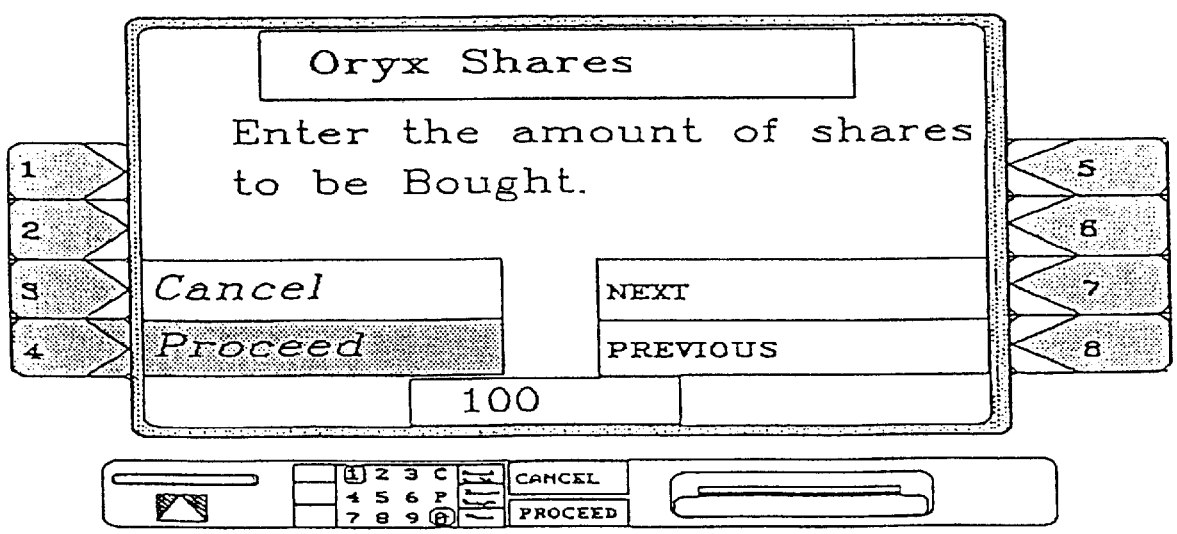
Figure 11G:
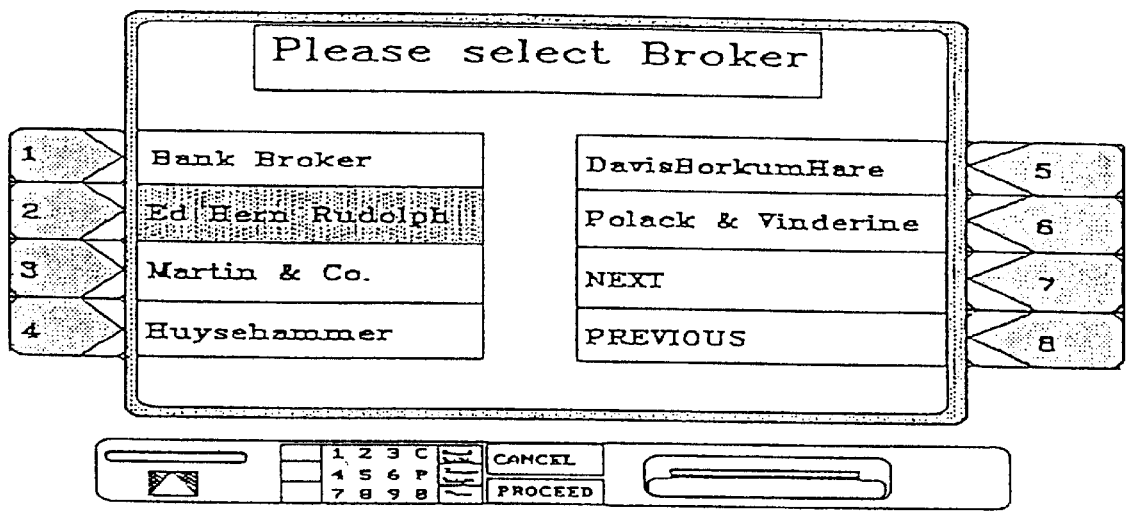
Figure 11H:
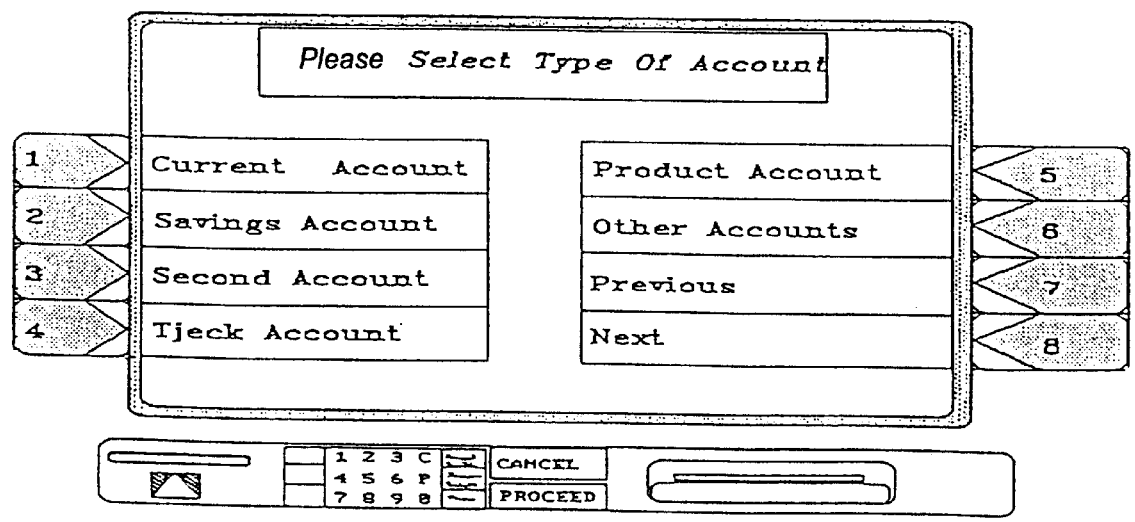

FIG. 10(h) shows a confirmatory screen which in the purchaser's various selections and the transaction-related information is confirmed. At this stage the purchaser may revise or edit any of the transaction options, cancel the transaction or accept and confirm the selection of options.

FIG. 10(i) shows a print-out which is generated by the printer 70 of an ATM, and which acts as a voucher or transaction statement, and serves as proof of the transaction. The transaction-related information is also incorporated into a bank statement issued by the bank to the purchaser so that the purchaser is provided with a record of transactions conduct at the end of each month.

Once a transaction has been completed, the system software has the ability to debit and credit the respective accounts of the purchaser and the vendor to reflect the value that has changed hands in the course of the transaction. In this way, the vendor is spared the effort of sending an account to the purchaser, and waiting payment in response to the account, as is the case with known "computer-shopping" systems. For example, the statement shown in FIG. 10(i) shows that the purchaser has gained winnings of R641 2.00, and the system software will thus automatically credit the purchaser's account with this amount, while debiting the vendor's account for the same value.

By way of a further example, the menus for exercising options relating to a share purchasing transaction are shown in FIG. 11(a) to FIG. 11(h). Having selected the "SHARES" option on the product main menu, the purchaser will then be required to select a share type, such as "MINING". The purchaser is then presented with the various categories of mining shares, before being presented with options relating to specific mines. The purchaser can then opt to either buy or sell a certain number of shares or a certain value of shares by the menus illustrated in FIG. 11(e) and (f). The purchaser can then select a broking firm through which the transaction is to be processed, and a bank account from which the relevant funds are to be transferred. As with the previous example, the printer 70 of the ATM 12 will then produce a statement, such as that indicated in FIG. 11(i), which serves as proof of the transaction.

Figure 12A:
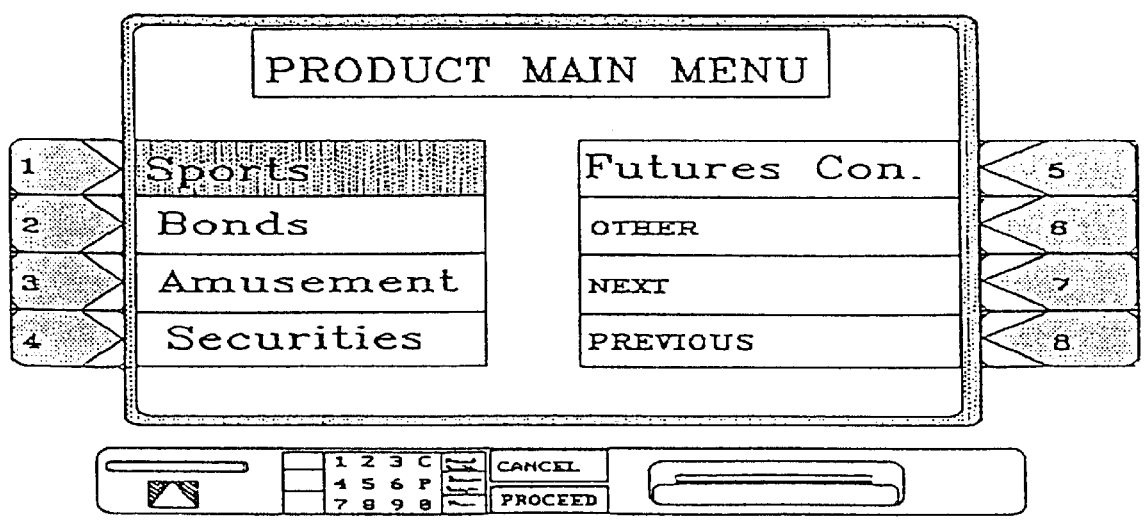
Figure 12B:
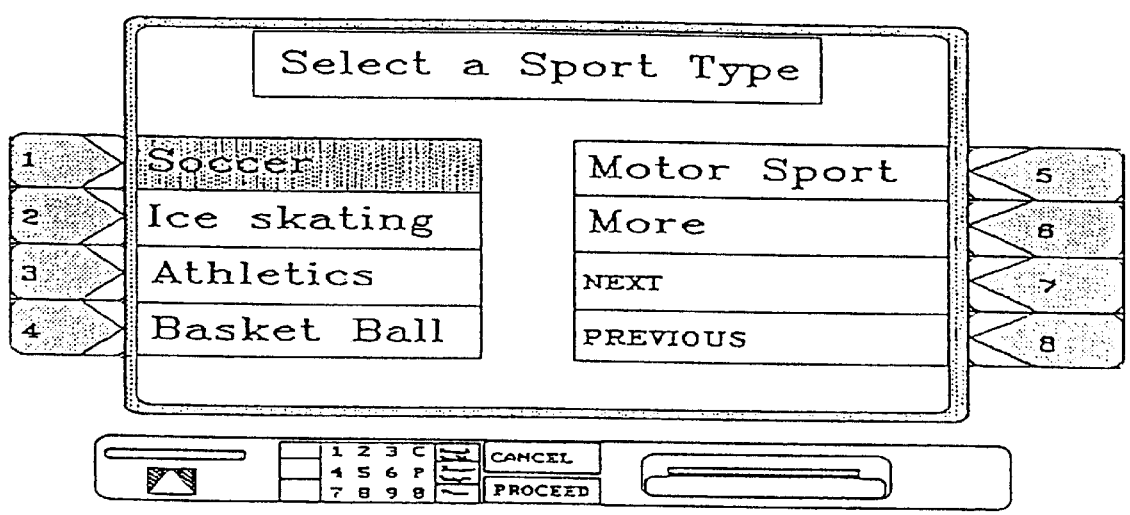
Figure 12C:
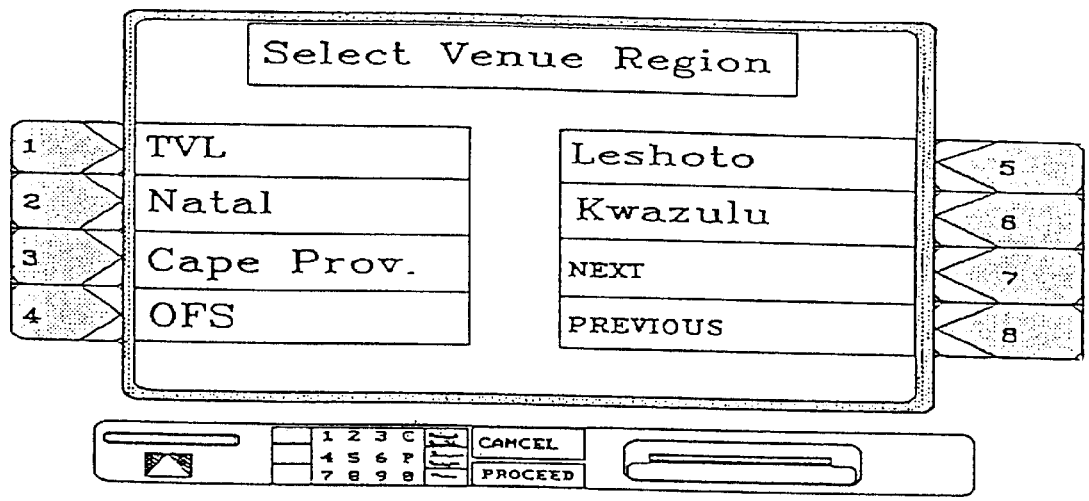
Figure 12D:
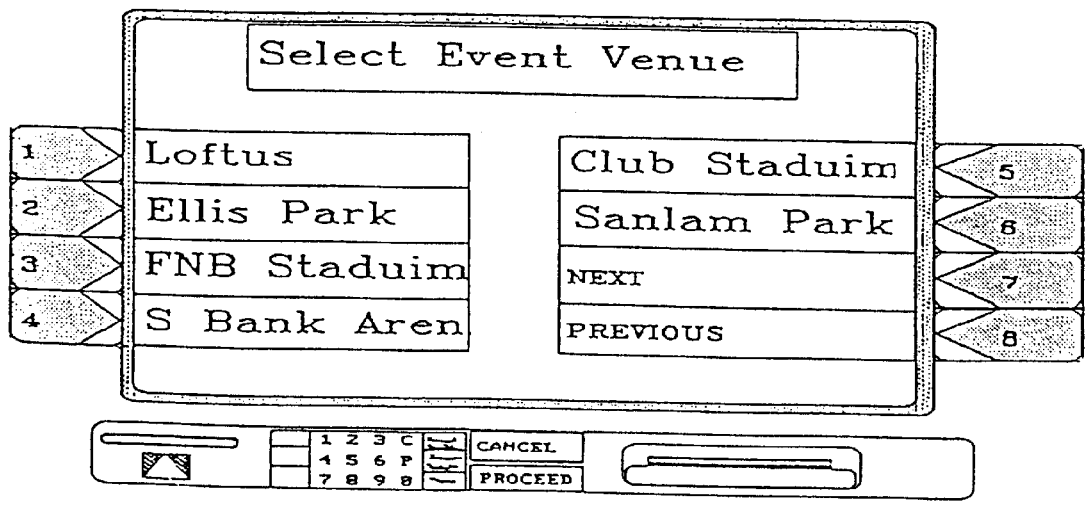
Figure 12E:
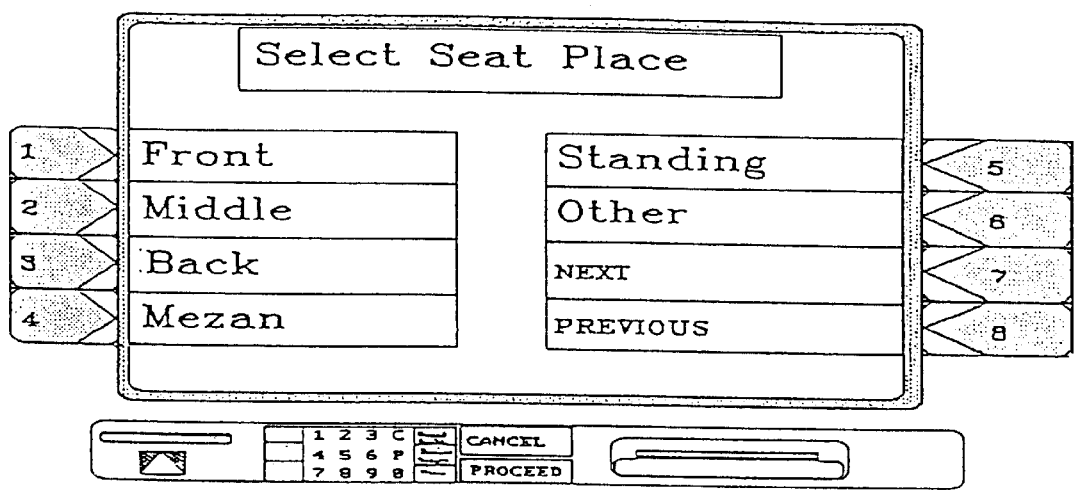
Figure 12F:
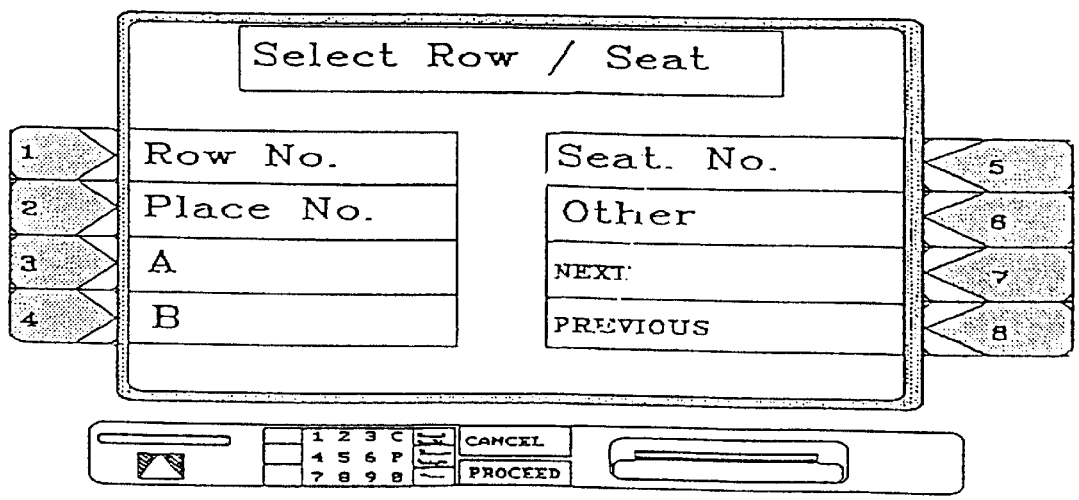
Figures 12G, 12H:
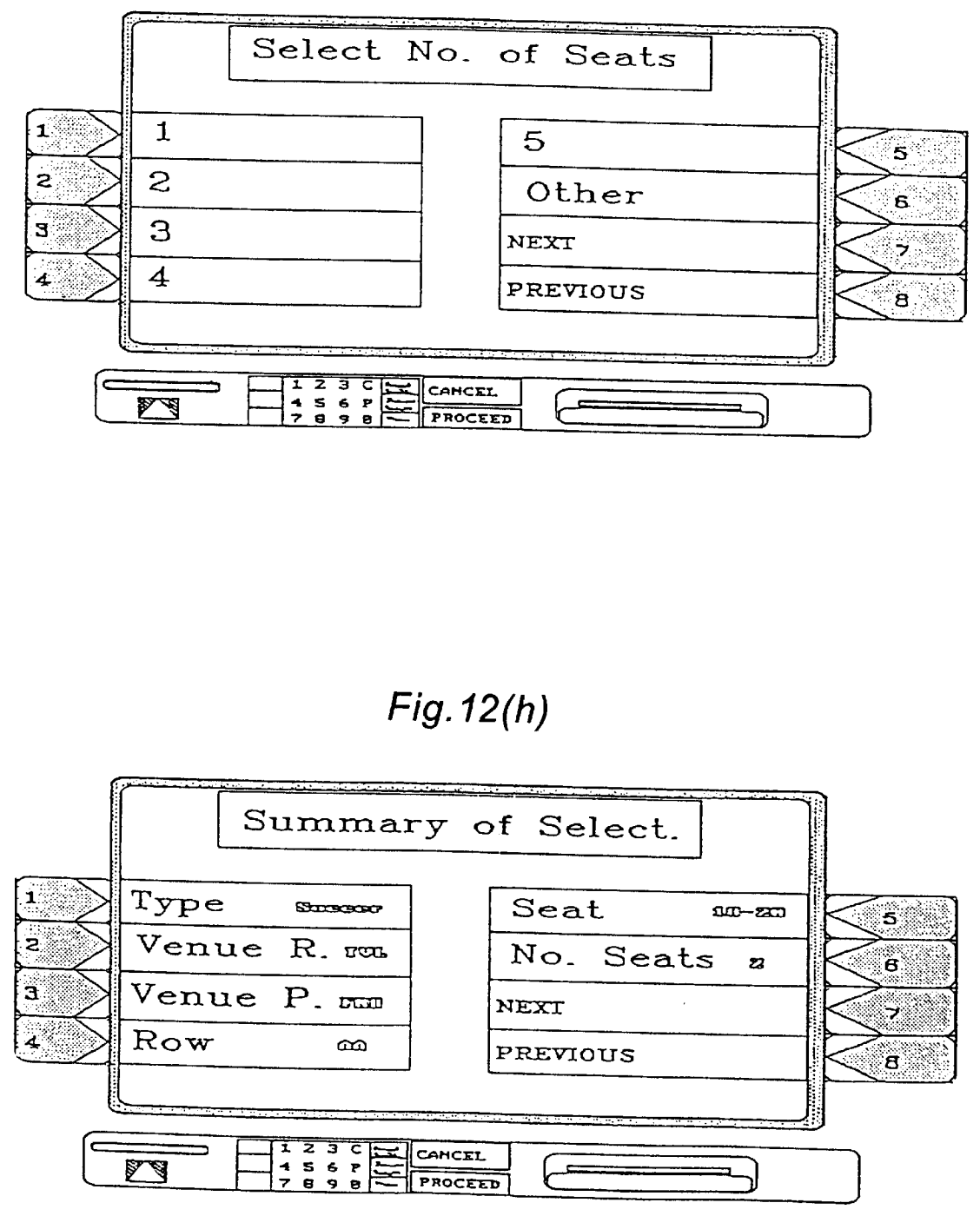
Figure 13A:
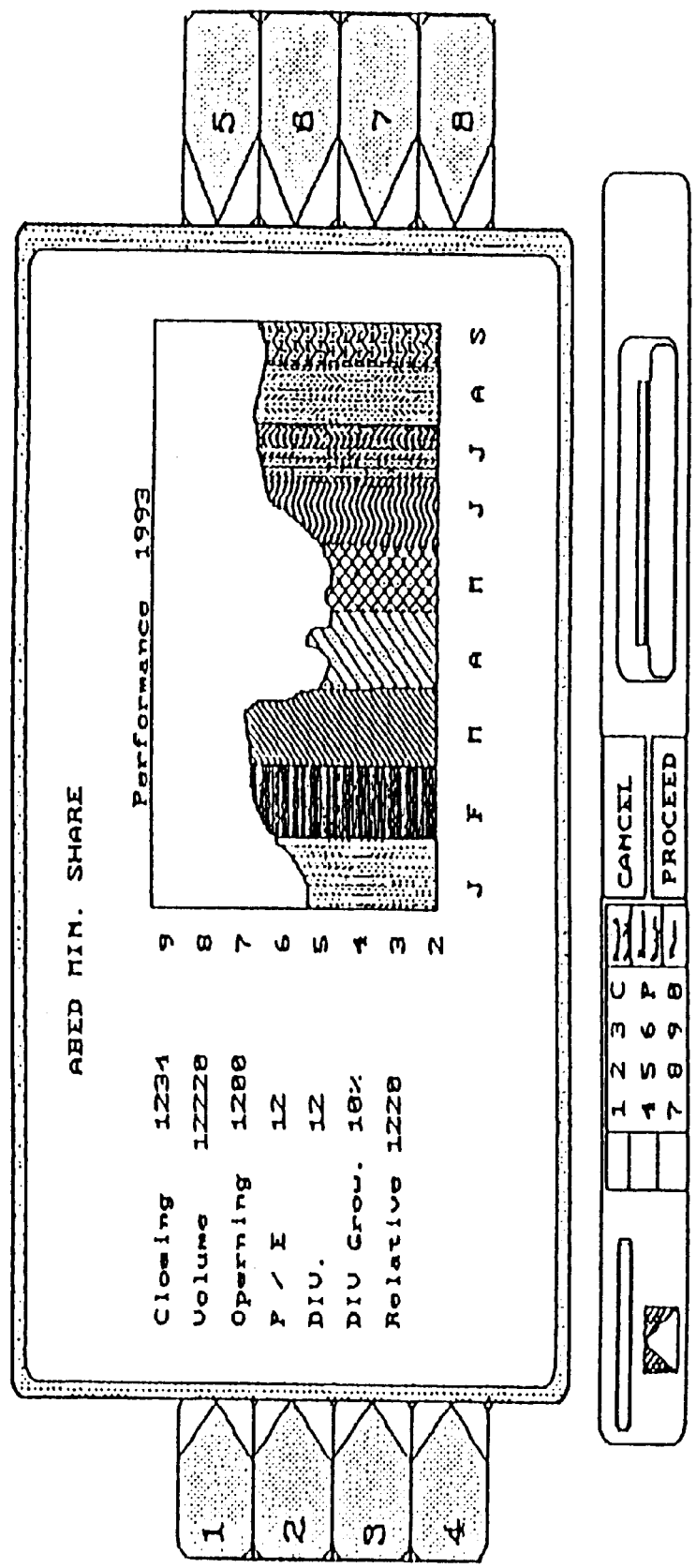
FIGS. 13(a) to (g) show various examples of product information screens that are displayed by the ATM.
Figure 13B:
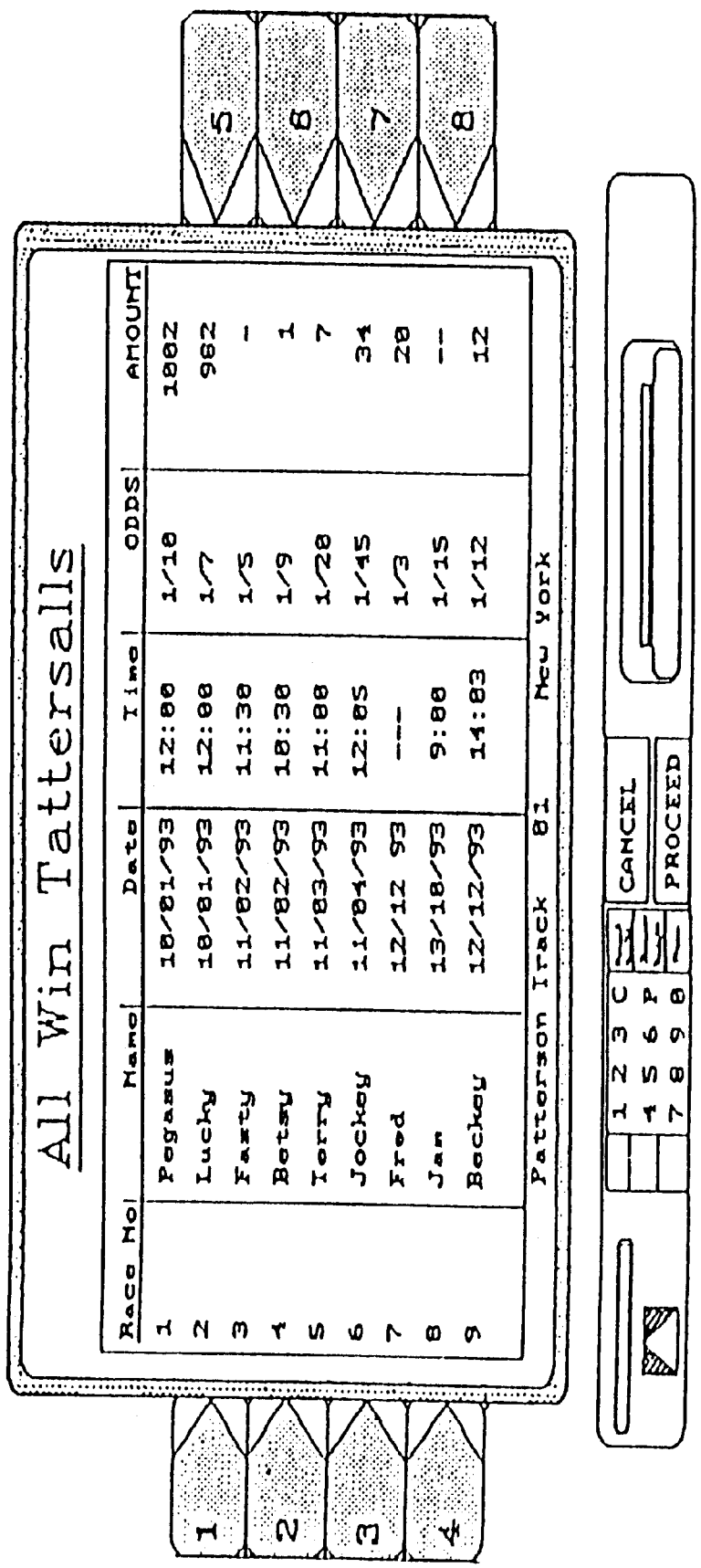
Figure 13C:
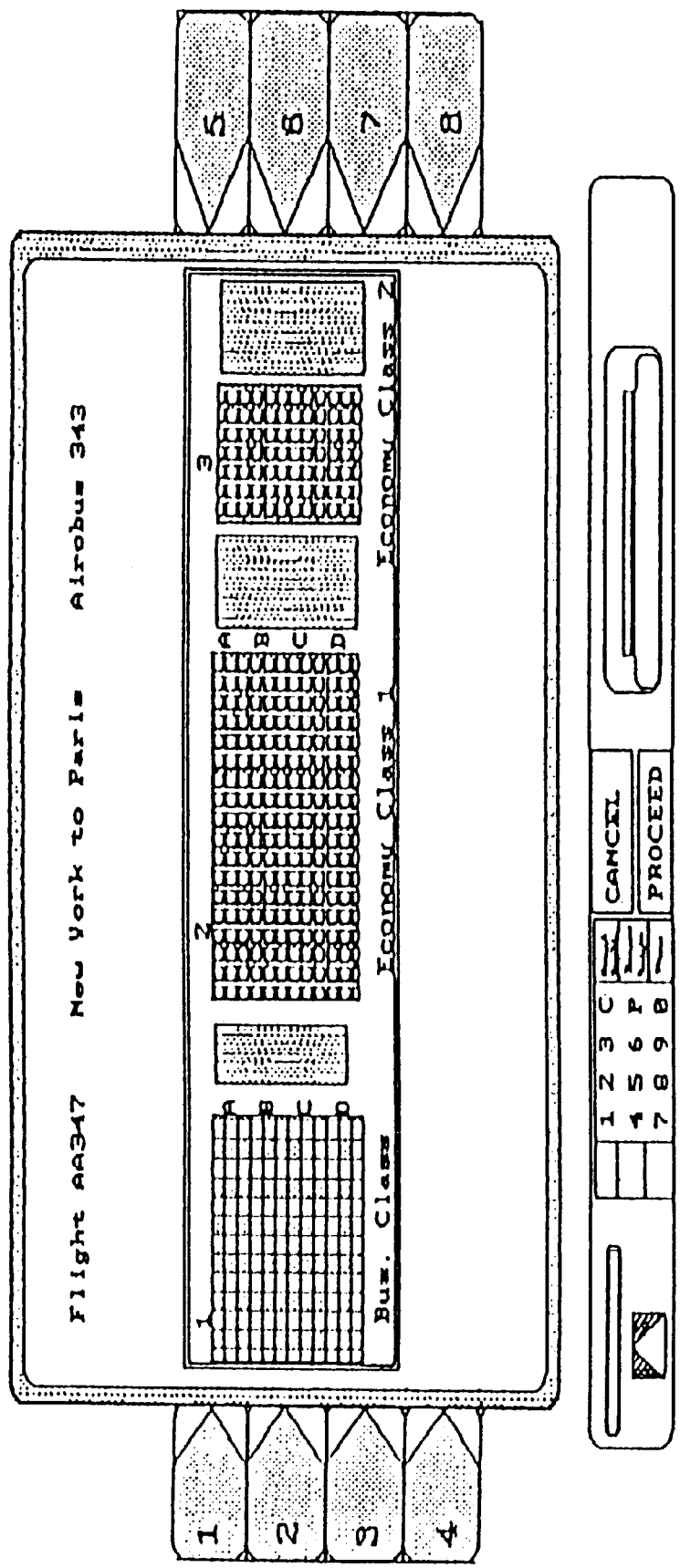
Figure 13D:
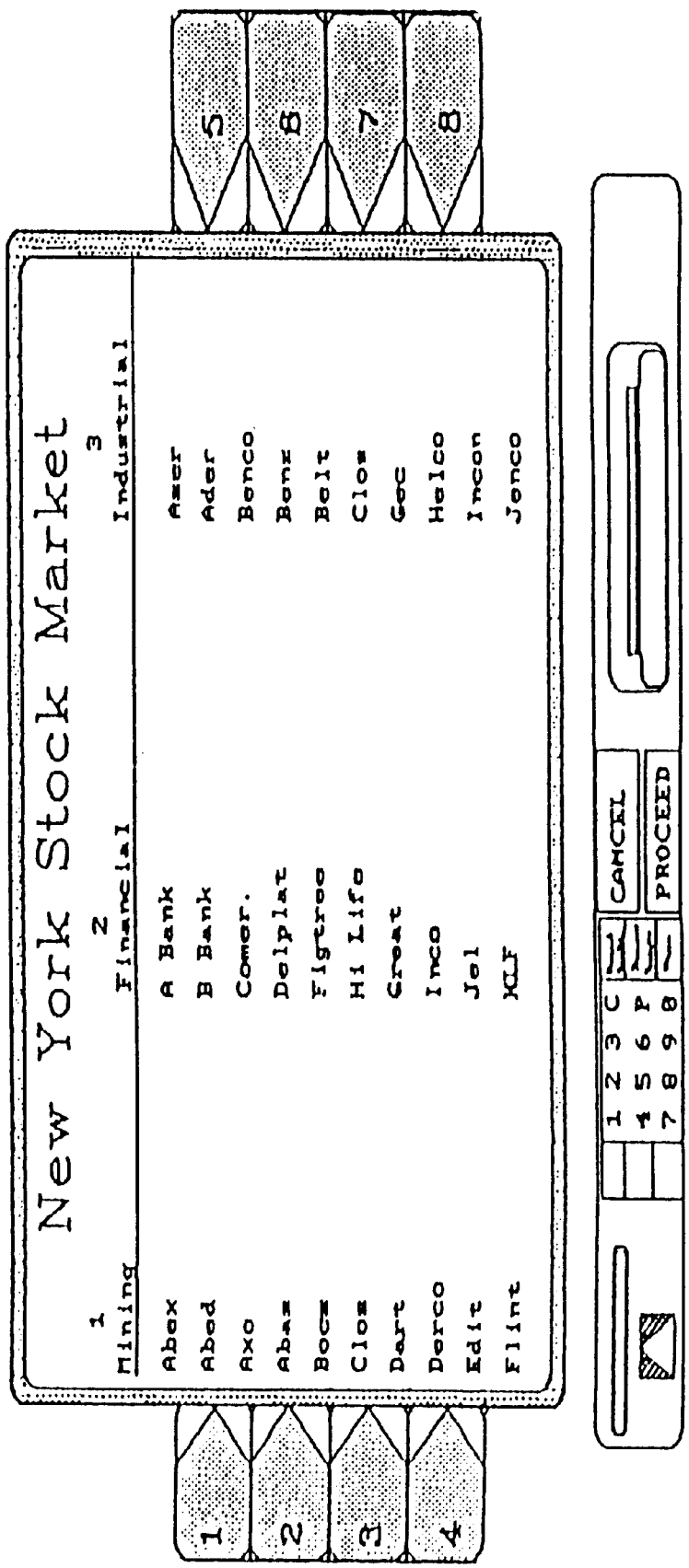
Figure 13E:
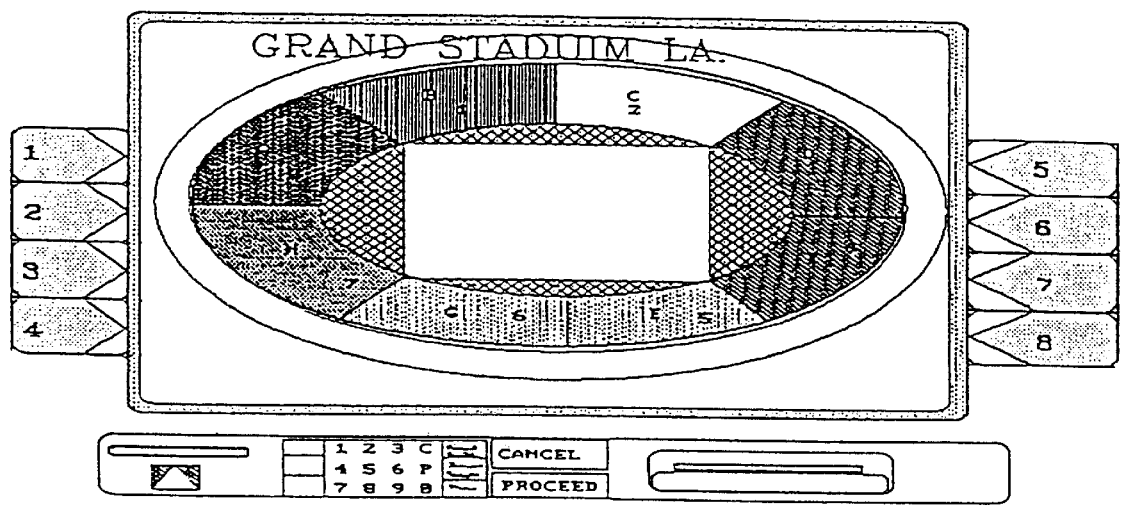
Figure 13F:
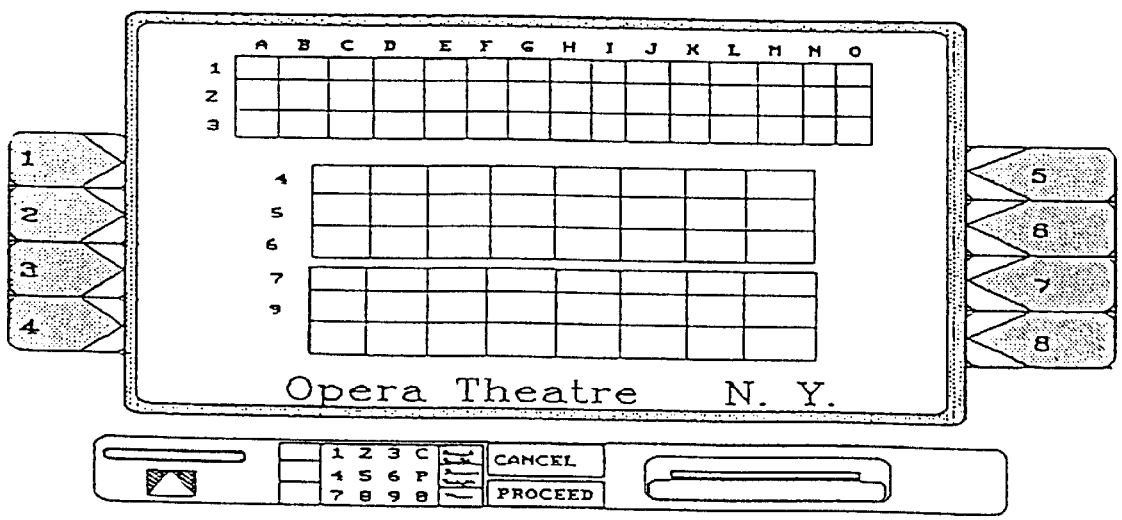
Figure 13G:
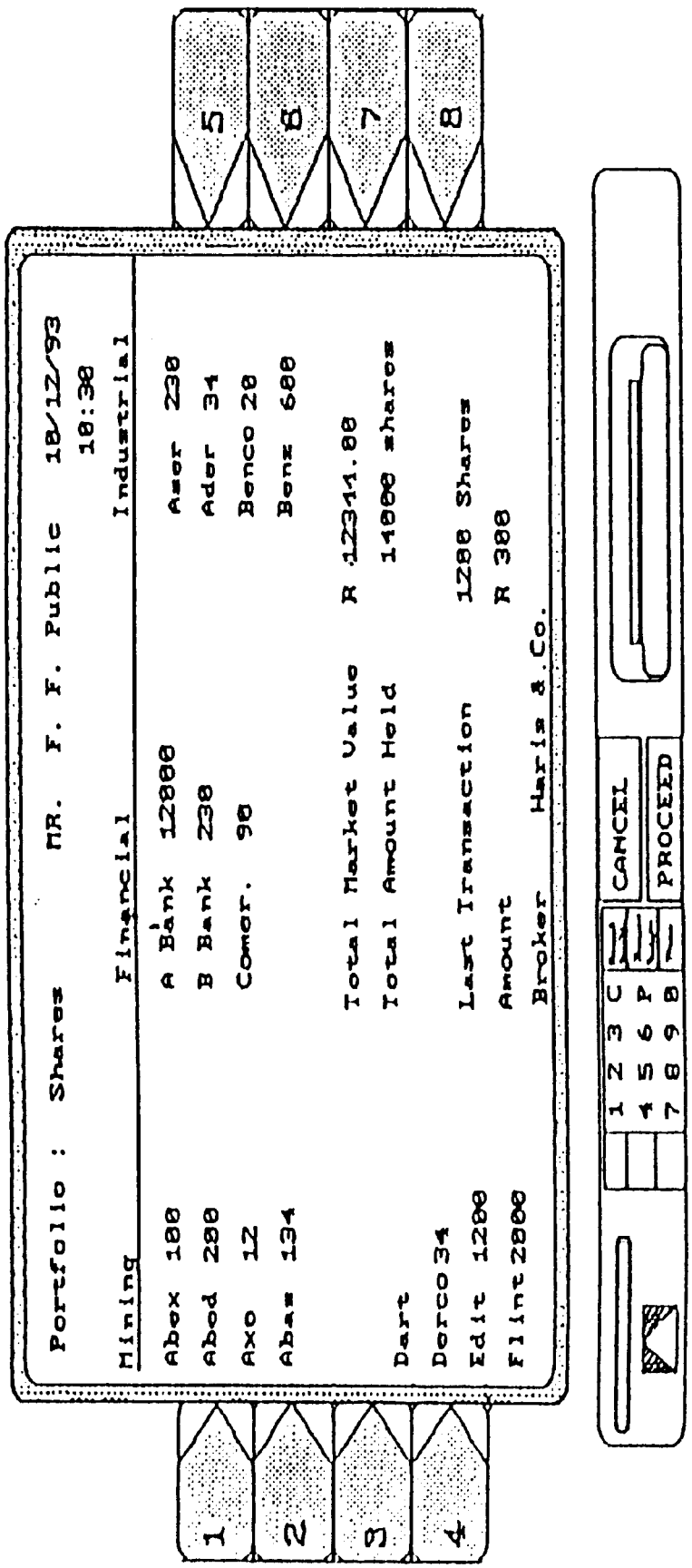
Figure 14A:
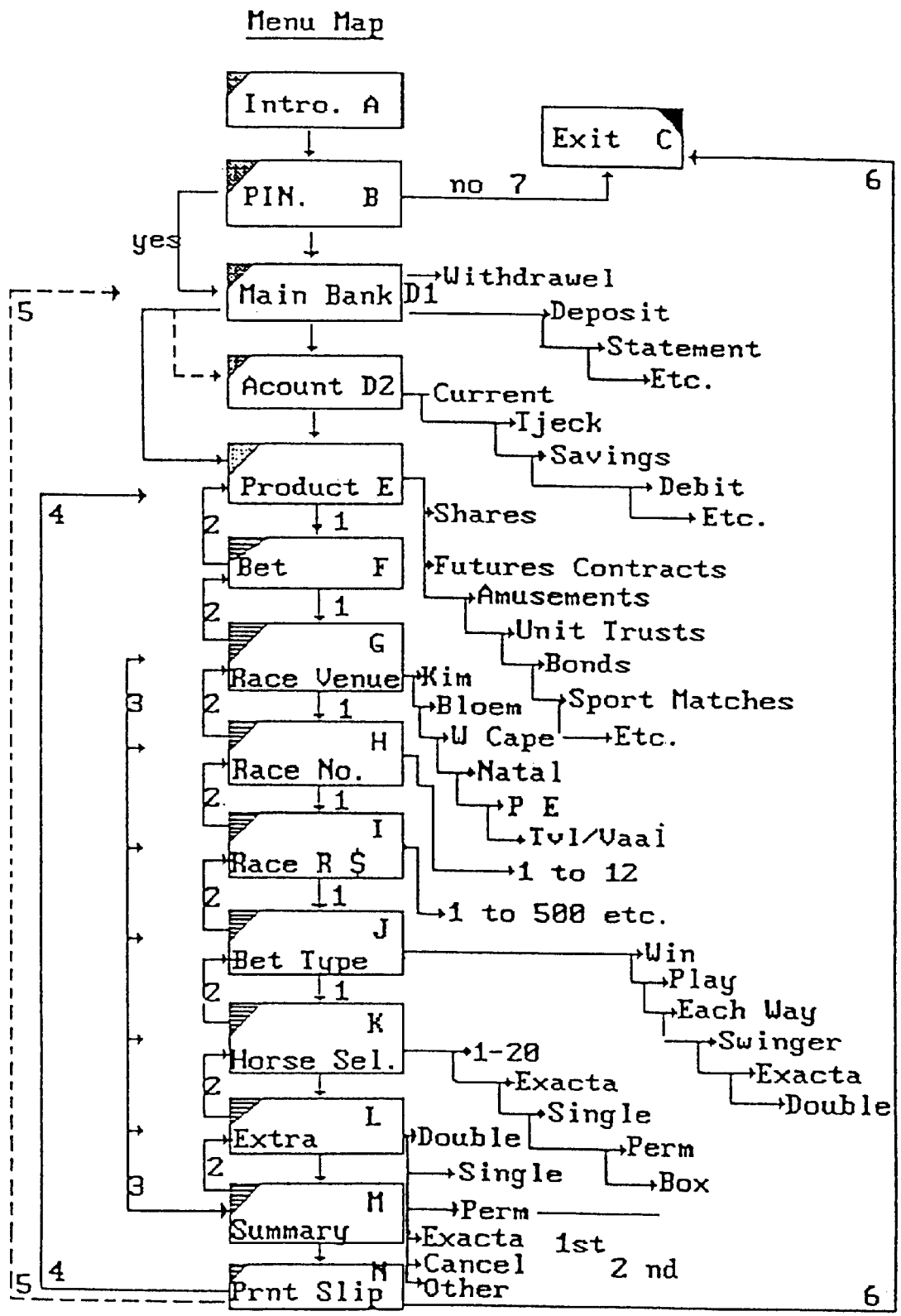
FIG. 14(a) is a flow chart showing the sequence of transaction options presented to a purchaser when conducting a betting transaction on the ATM.
Figure 14B:
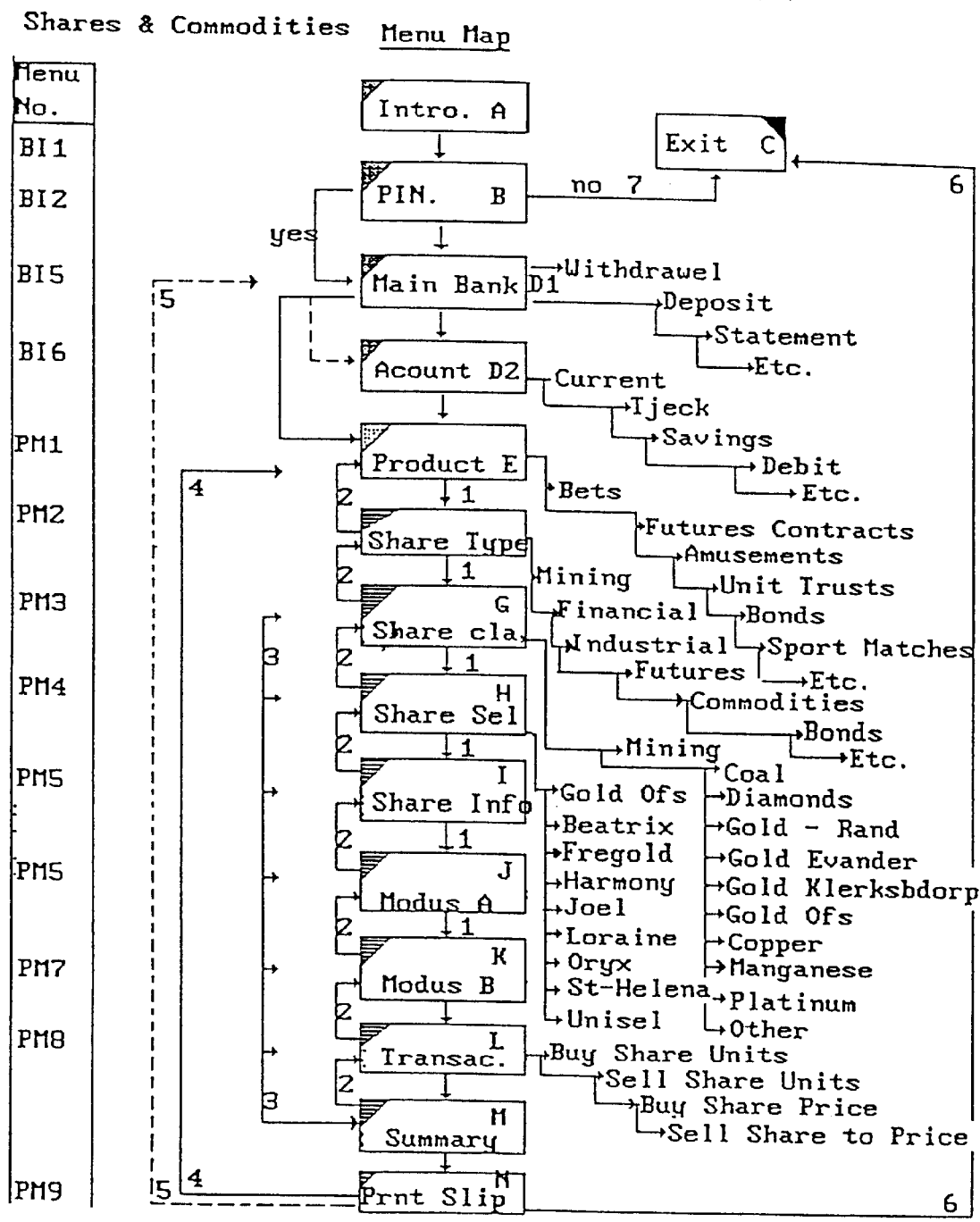
FIG. 14(b) shows a flow chart showing the sequence of transaction options presented to a purchaser when performing a share purchasing transaction.
Figure 14C:
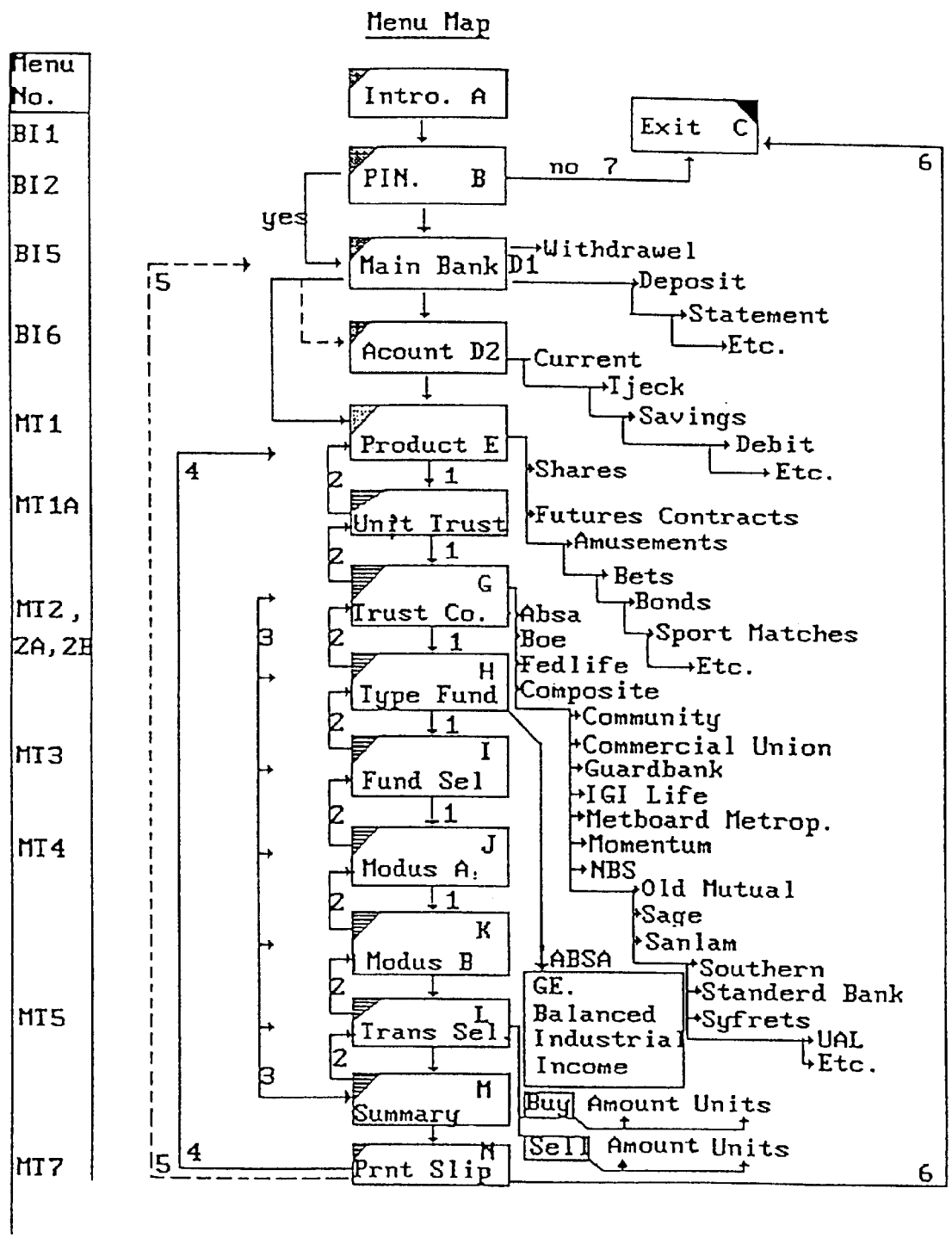
FIG. 14(c) shows a flow chart showing the sequence of transaction options presented to a purchaser when performing a unit trust purchase transaction.
Figure 14D:
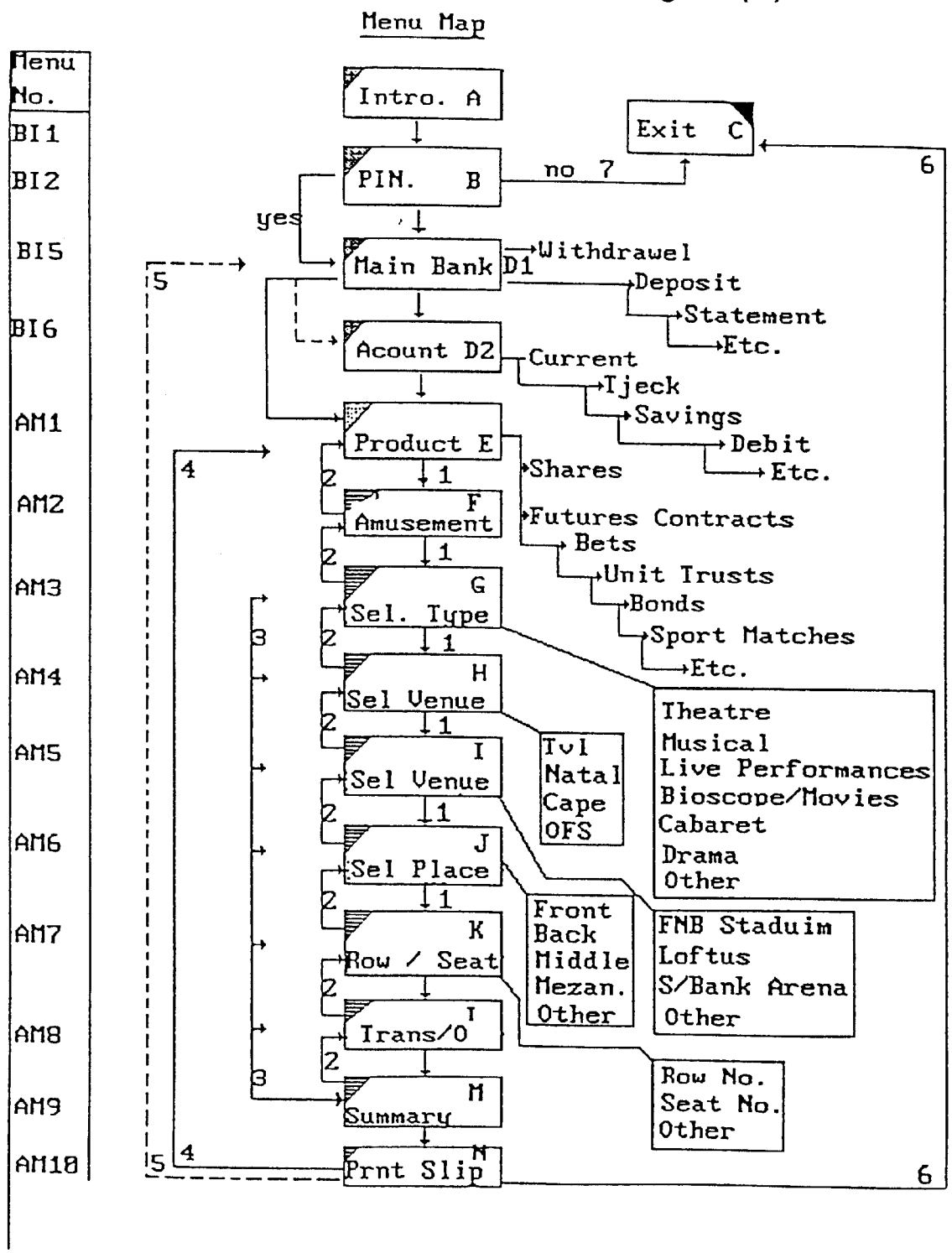
FIG. 14(d) shows a flow chart showing the sequence of transaction options presented to a purchaser when performing an entertainment ticket purchase.
Figure 14E:
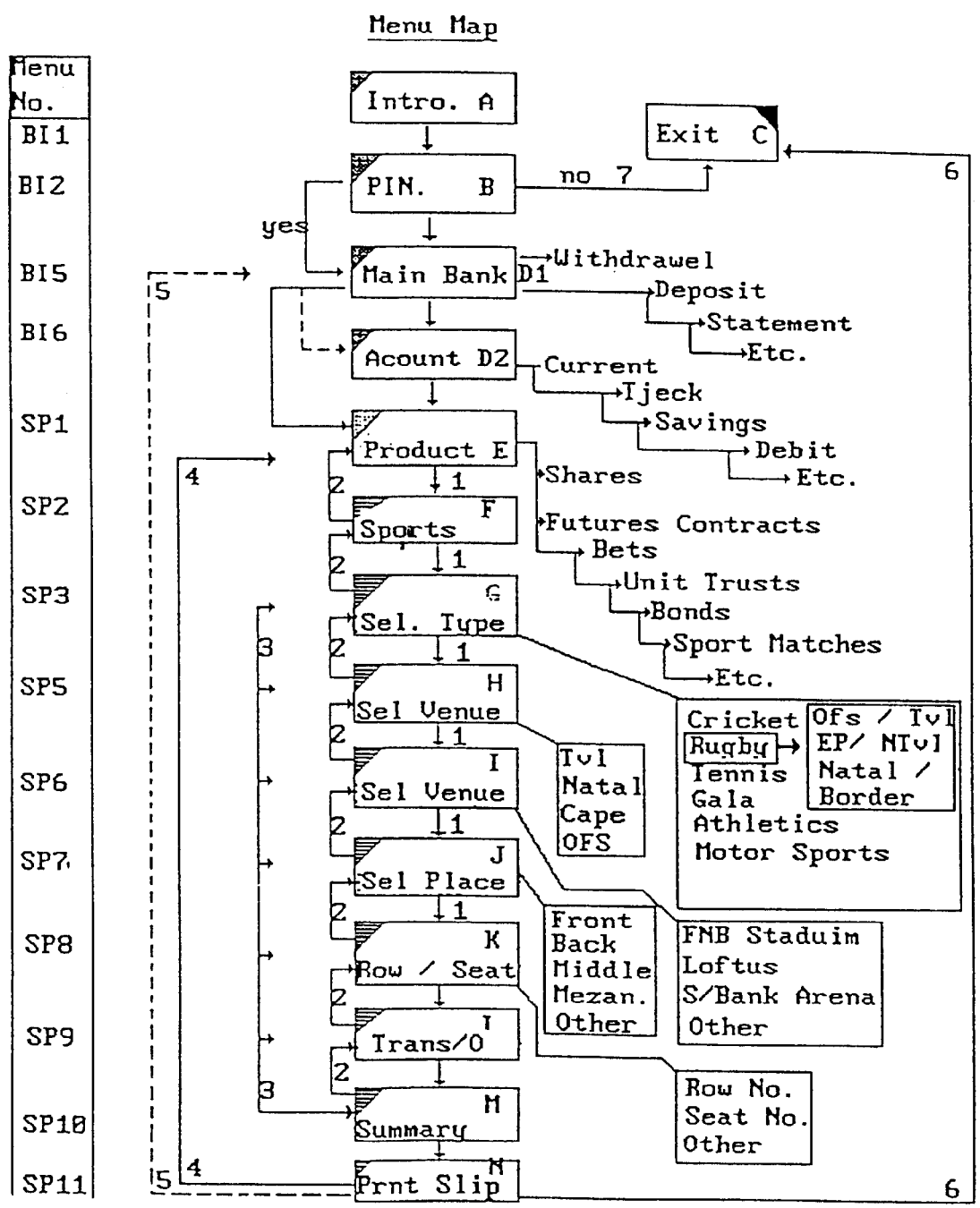
FIG. 14(e) shows a flow chart showing the sequence of transaction options presented to a purchaser when performing a sports event ticket purchase.
Figure 14F:
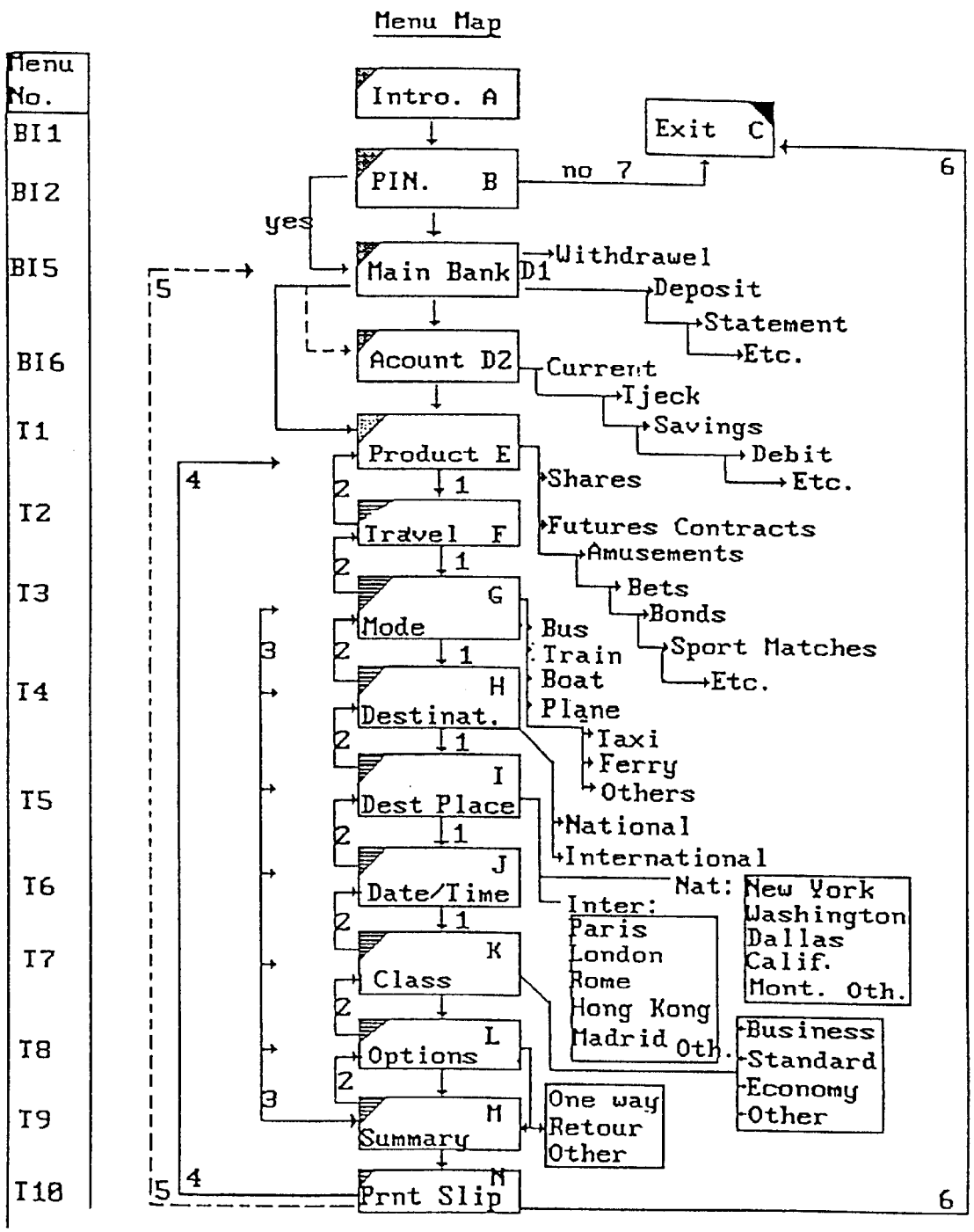
FIG. 14(f) shows a flow chart showing the sequence of transaction options presented to a purchaser when conducting a travel ticket purchase.
Figure 14G:
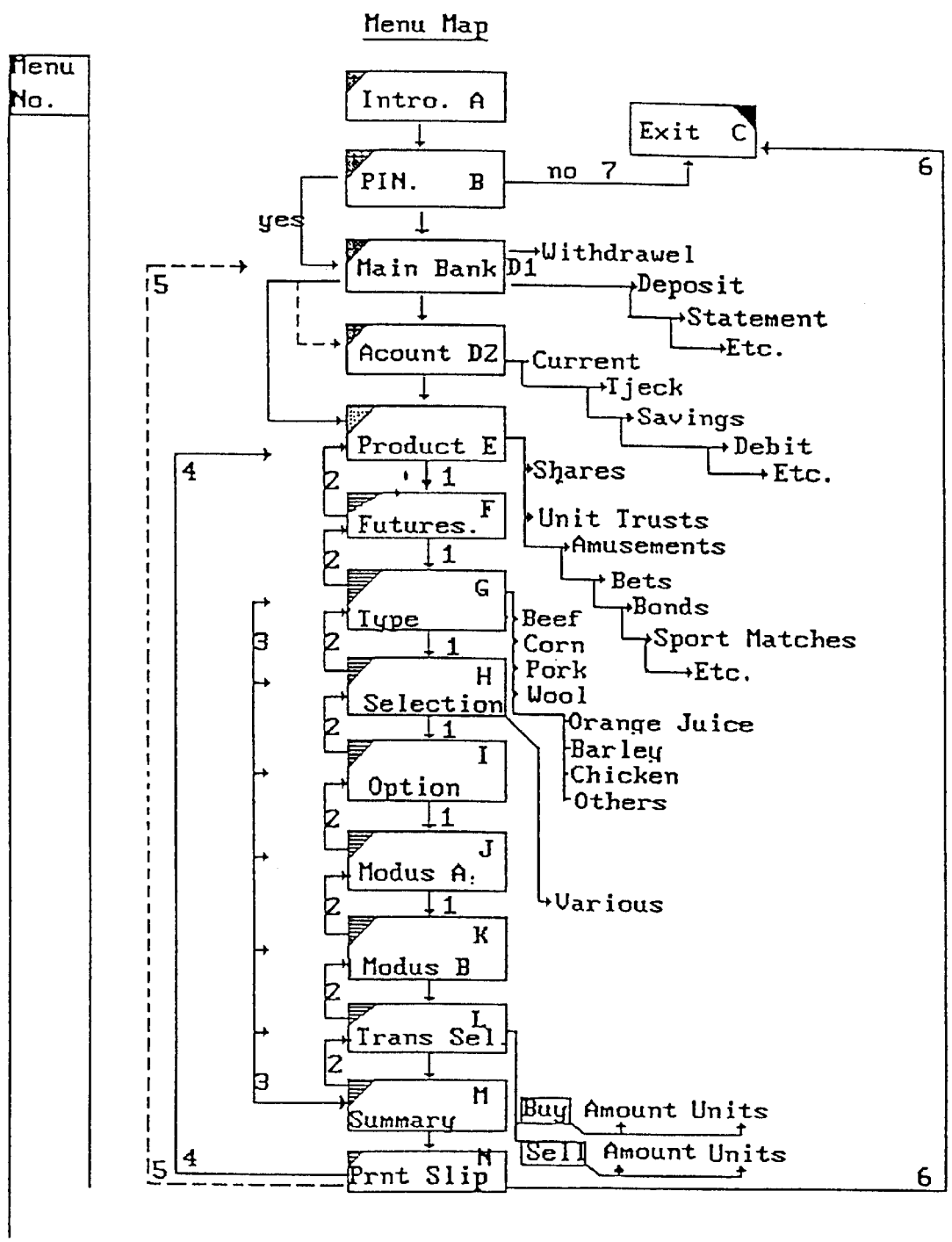
FIG. 14(g) shows a flow chart showing the sequence of transaction options presented to a purchaser when conducting a futures purchase transaction.
Figure 14H:
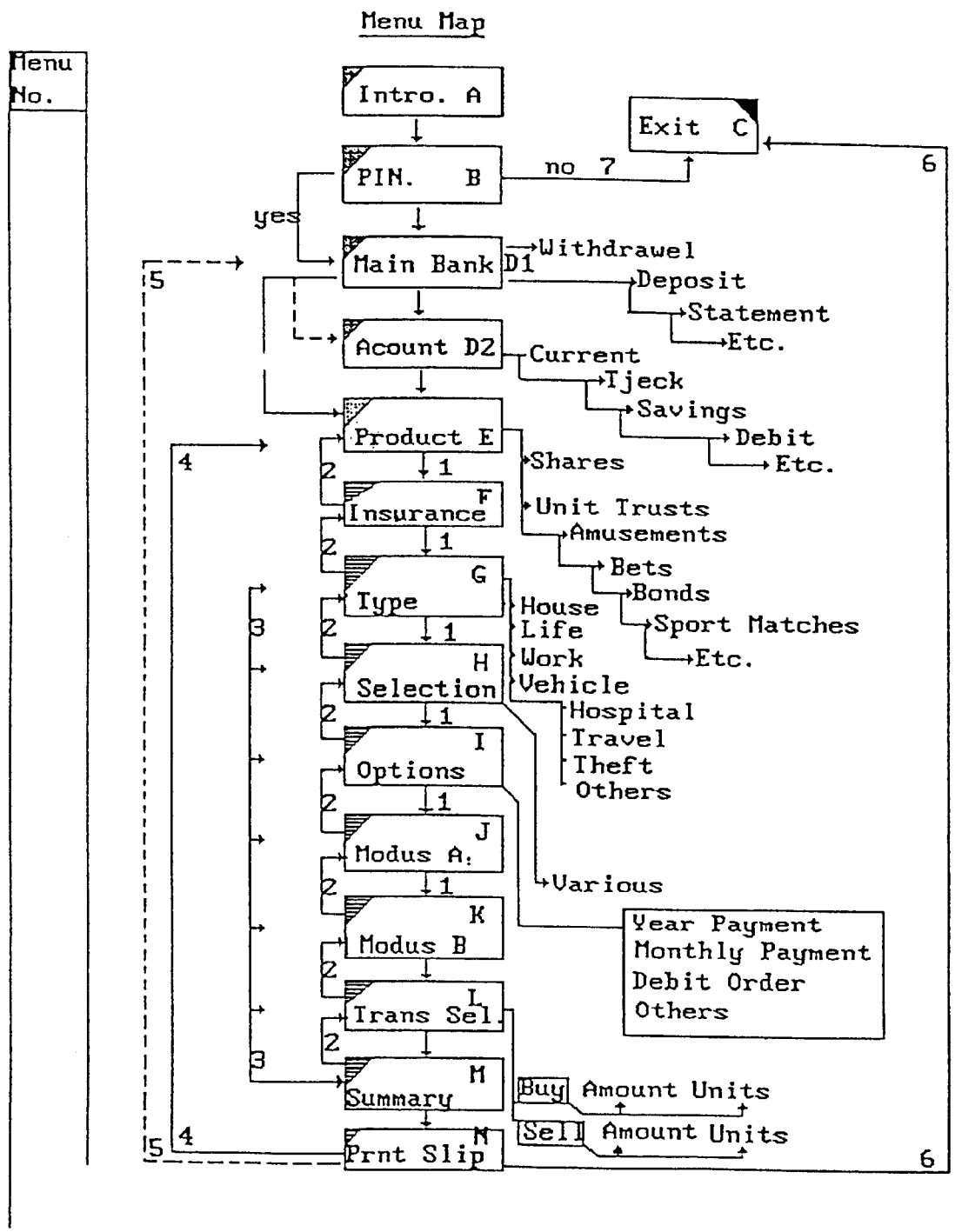
FIG. 14(h) shows a flow chart showing the sequence of transaction options presented to a purchaser when performing an insurance purchase transaction.

The menus for providing the options relating to a ticket purchasing transaction are illustrated in FIG. 12(a) to FIG. 12(h), and a voucher produced by the ATM at the conclusion of the transaction is illustrated in FIG. 12(i). The system software may be configured to identify venues within a predetermined proximity to the relevant ATM, and only to provide tickets available at such venues to improve the user-friendliness of the system.

FIG. 13(a) to FIG. 13(g) illustrates selected examples of product information screens that can be presented to purchasers during the course of exercising transaction options on various menus. These product information screens may glean the information display thereby from the vendor product information updating system 26, or a vendor database 24. Furthermore, the system software may update this product-related information in real time or merely when a particular product information screen is required to be displayed at an ATM. The product information screens may perform a number of functions, including providing the purchaser with information useful or essential to performing the transaction, such as the history of a share or a particular horse, or the seat locations on an aircraft or in a theatre or stadium. The product information screens may also provide the purchaser with a summary of his or her share portfolio prior to buying or selling shares, or a summary of transactions conduct by the purchaser on the system 10 over a predetermined period of time. Of course, the illustrated examples are merely a selection of product information screens that could be produced to assist the purchaser in performing a transaction.

The purchaser is also provided with the option of obtaining a hard copy of the information displayed on any product information screen, and is able to perform a "screen-dump" or print instruction to the ATM printer.

The system software also includes driver's for producing a number of help screens which provide the purchaser with instructions regard navigation through the system software, and the procedures for selecting transaction options.

The system software also includes a number of message interrupt procedures whereby the purchaser can be provided with information having a bearing on the successful completion of the transaction, regardless of the menu displayed on the screen. For example, if the ATM network were to fail while the purchaser is inputting transaction options via a menu, an interrupt procedure will display the message "Network failure—transaction aborted" in a window that is superimposed over the current menu.

FIG. 14(a) to FIG. 14(h) show flow charts illustrating the sequence of transaction options which are presented in menu format to a purchaser performing a transaction. Again merely for illustrative purposes, the transaction options for placing a bet, purchasing a share, purchasing a unit trust, purchasing an entertainment ticket, purchasing a travel ticket, purchasing a futures contract or purchasing an insurance policy are shown.

Figure 15A:
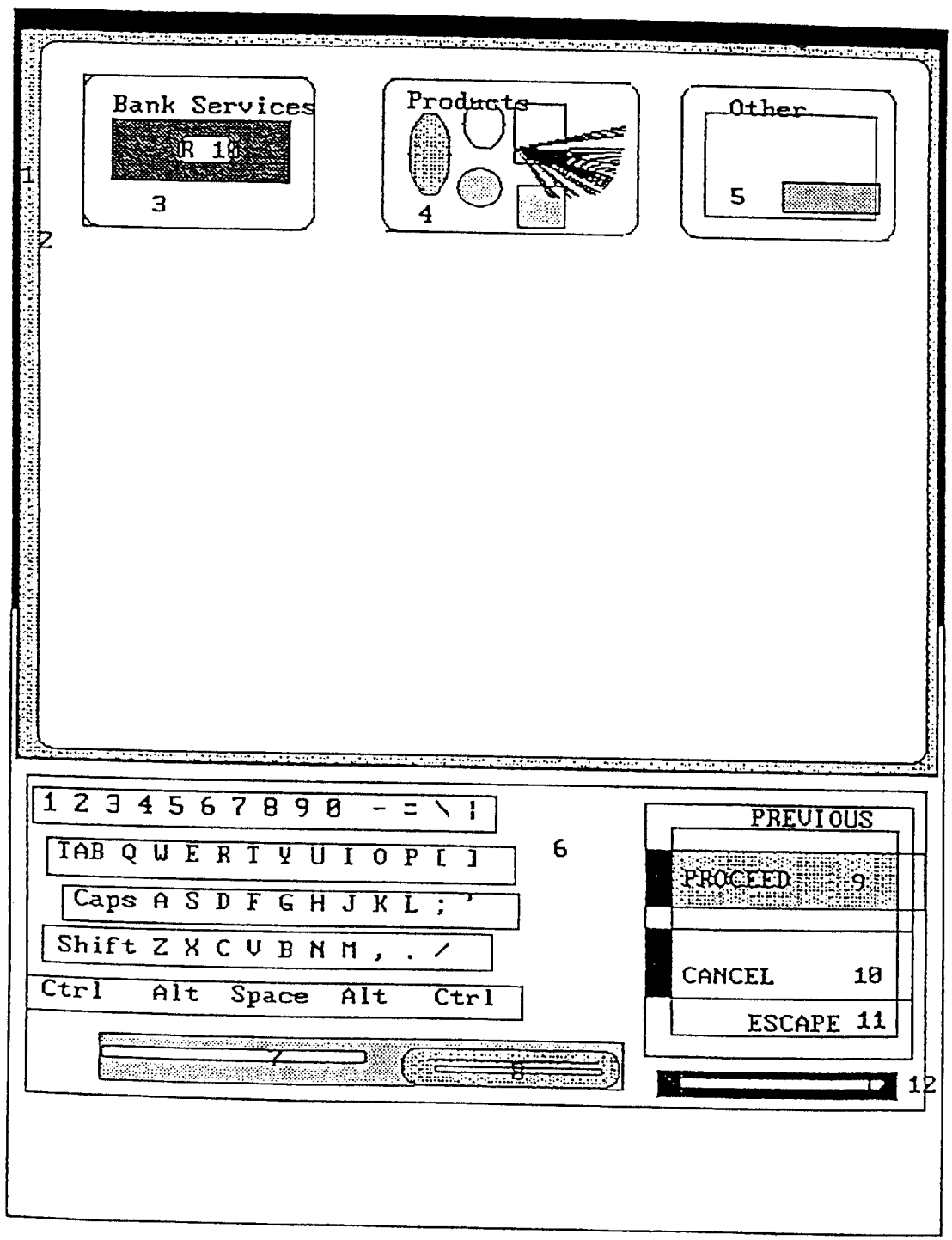
FIGS. 15(a) & (b) show alternative icon-driven menus.
Figure 15B:
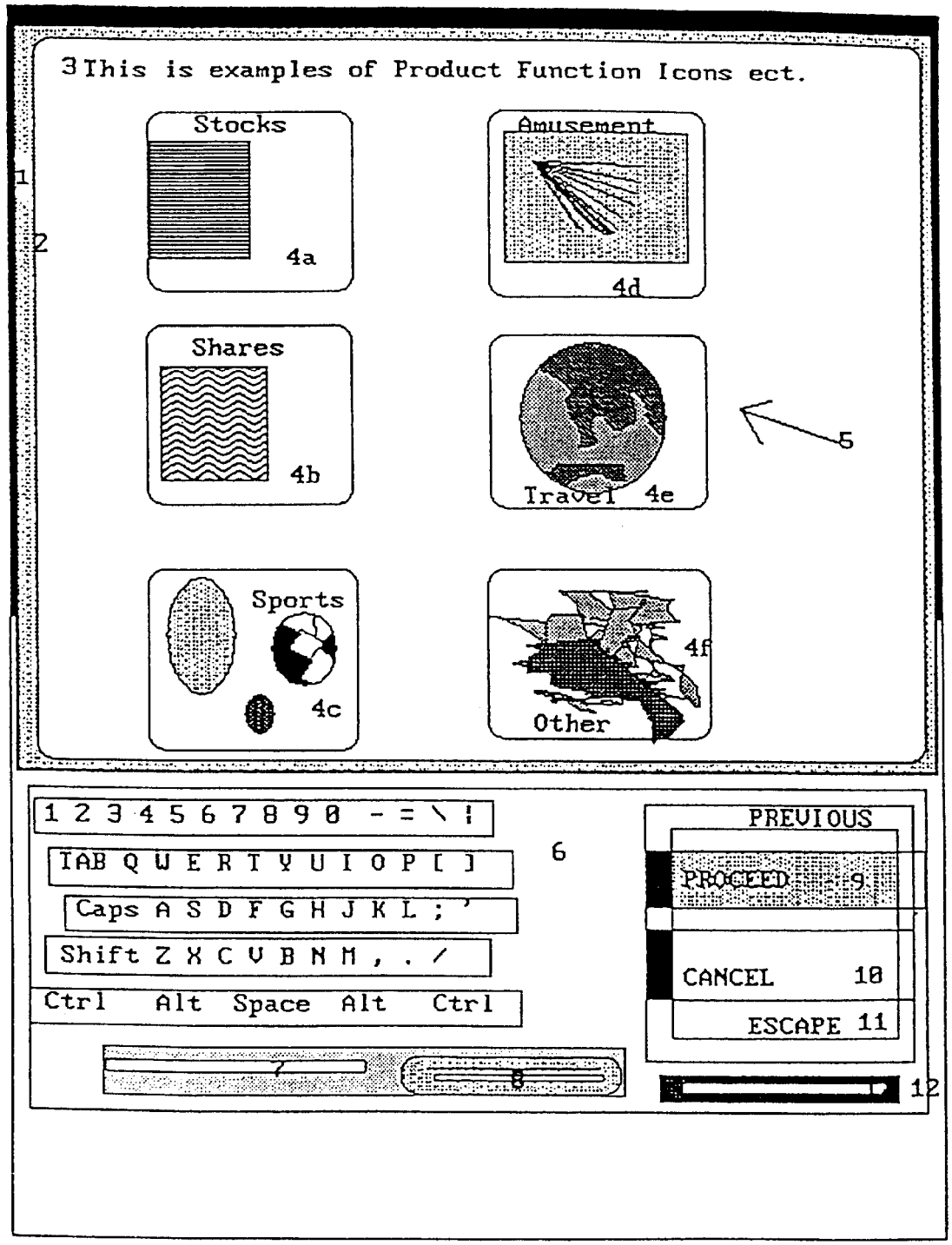

As an alternative to the menus shown in the previous examples, wherein selections are made by pressing physical keys located along the periphery of a screen, FIG. 15(a) and FIG. 15(b) show examples of icon-driven menus which may be used to exercise transaction options. It is envisaged that the screens of current ATM could be replaced by so-called "touch screens" which allow a purchaser simply to touch an appropriate icon displayed on the screen. The screen then senses the location of contact between a purchaser's finger and the screen, and in this way will determine the menu selection made by a purchaser. Icon-driven menus may be particularly attractive to encourage unsophisticated persons to perform transactions using the transaction system 10, as the various options can be displayed in a simple and easily understandable manner.

Figure 16A:
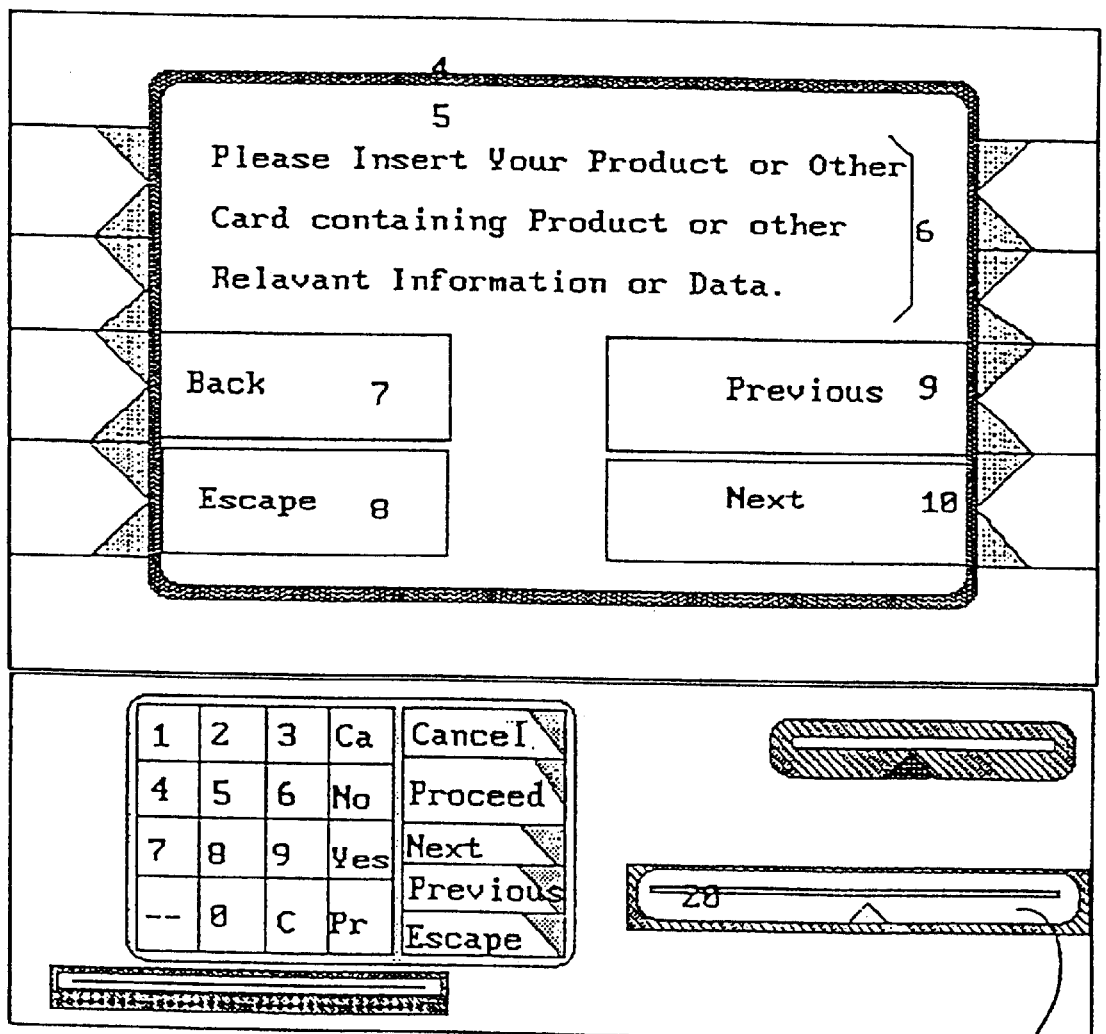
FIG. 16(a) is a front view of an ATM modified to receive a data card.
Figure 16B:
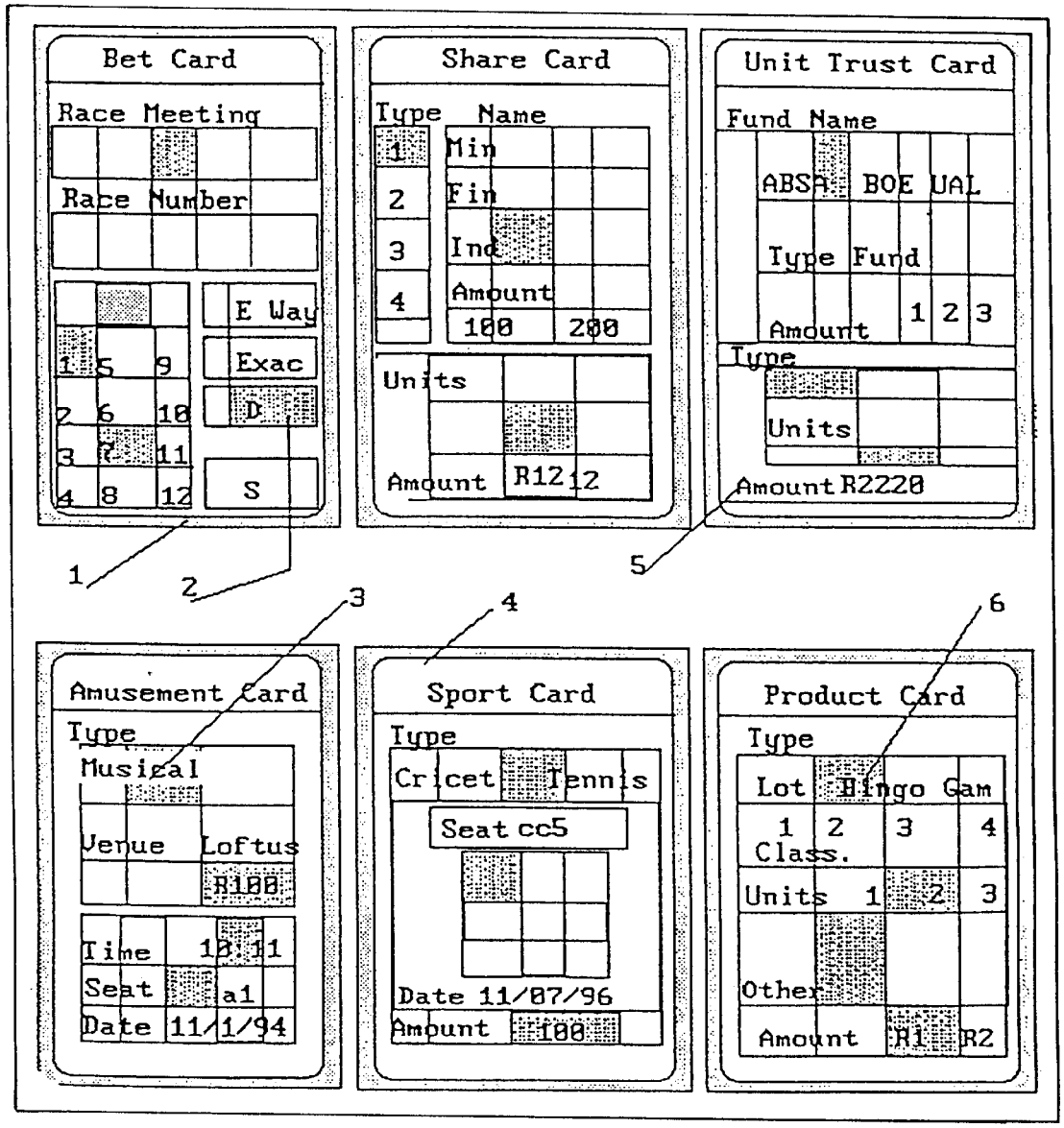
FIG. 16(b) shows examples of a number of different data cards.

An alternative method by which a purchaser can exercise transaction options is shown in FIGS. 16(a) and (b). The ATM depicted in FIG. 16(a) is provided with an additional optical card reading device 72, which is intended to receive one of the cards illustrated in FIG. 16(b). To exercise various options relating to a transaction, the purchaser simply marks the appropriate blocks on a transaction card 74, which is then fed into the optical card reading device 72. The selected transaction options are then displayed on the screen of the ATM. After confirmation of these options, the transaction system 10 will proceed to process the transaction, and debit and credit the necessary accounts. Before dispensing a transaction card 74, the card reading device 72 will also mark the card, by either punching a hole or printing an appropriate indicium of the card. A card so marked is then regard as proof of conclusion of the transaction between the relevant vendor and purchaser.

It is envisaged that the banks, vendors, updating system operators and ATM network operators will be able to derive either direct or indirect benefits from the installation of the transaction processing system 10. For example, the banks will benefit from increased use of ATM's and banking services. Furthermore, by charging a transaction fee on each transaction performed on the transaction system 10, the banks will be able to generate substantial fees. The ATM network operators, such as Saswitch or Multinet, will additionally be able to charge a service fee for each transaction performed, and in this way generate revenue. Finally, the vendors will benefit from increased trading and sales that are performed on the transaction system 10, and may also charge a service fee for each transaction that utilizes their vendor database 24.

The various service and transaction fees are credited directly to the accounts of the various service providers on conclusion of a particular transaction.

While "home shopping" via computers is known, the problem with such systems is that a large percentage of the population do not have access to personal computers on which purchases can be made in this way. The widespread distribution of ATM's throughout South Africa has the result that ATM's are accessible to a large percentage of the population, particularly in urban areas. It is envisaged that, through the transaction processing system 10, a large percentage of the population will have access to the convenience and speed of purchasing products via a computer. ATM's included in the system 10 also allow purchasers to conduct transaction at any time of the day or night without the need for carrying or producing cash. Finally, the system 10 can be implemented using current ATM's and ATM networks, and will not require a large capital layout.

What is claimed is:

1. A method of conducting a financial transaction between a purchaser and a vendor of a product, the method comprising the steps of:

providing a computerized banking system comprising a plurality of financial institutions; each of said plurality of financial institutions comprising a computer centre comprising a plurality of computer based client accounts, an electronic data network interconnecting said computer centres; and a plurality of data exchange terminals connected to said network;

providing at least one vendor database including product related information connected to the said network;

providing product-related information to the purchaser via one of said terminals;

communicating to the vendor database via the network product related information regarding a product required by the purchaser and which information is provided by the purchaser via one of said terminals; and initiating payment by the purchaser for the product in an amount equal to the value of the transaction.

2. A method according to claim 1 wherein the terminal includes a display, and the method includes the step of displaying at least one enquiry menu on the display to obtain transaction-related information from the purchaser.

3. A method according to claim 2 including the step of incorporating icons associated with options relating to the transaction into the at least one enquiry menu so that the purchaser is able to provide the transaction-related information by selecting an icon displayed on the display means.

4. A method according to claim 2 including the steps of displaying at least part of the product-related information of the display means, and updating the product-related information in real time response or on the occurrence of a transaction between the purchaser and the vendor.

5. A method of conducting a financial transaction between a purchaser and a vendor of a product, the purchaser and the vendor being associated with respective first and second accounts held at respective first and second financial institutions, the method comprising the steps of:

providing at least one vendor database including product-related information;

linking a data exchange terminal to the at least one vendor database via a data network linking said first and second financial institutions;

obtaining transaction-related information regarding a product required from the purchaser via the terminal;

communicating the transaction-related information via the network to the vendor database; and initiating an electronic transfer of funds from the first account to the second account for the value of the transaction.

6. A method according to claim 5 wherein the first and second financial institutions comprise the same financial institution.

7. A method according to claim 5 wherein the transferring of funds electronically involves debiting the first account and crediting the second account.

8. A method according to claim 5 including the step of obtaining an access code from the purchaser to verify authorization of the transaction.

9. A method according to claim 5 wherein the funds are transferred electronically between the first and second accounts in real time response at the conclusion of the transaction.

10. A method according to claim 5 wherein the funds are transferred electronically between the first and second account at a predetermined future time.

11. A method according to claim 5 wherein the transaction-related information includes at least product identification information, the value of the transaction and details of the first account to or from which funds are to be electronically transferred.

12. A method according to claim 5 including any one or more of the steps of verifying the availability of funds in the first account, the availability of the vendor product or the qualification of the purchaser to perform the transaction before conclusion of the transaction.

13. A method according to claim 5 including the step of printing a record of the transaction which serves as proof of the transaction.

14. A method according to claim 2 including the step of reading an indicator at the terminal, the indicator being configurable by the purchaser to indicate the transaction-related information.

15. A method according to claim 2 including the step of incorporating the transaction-related information into a statement issued by the first or second financial institution to the purchaser or vendor.

16. A system for conducting a financial transaction between a purchaser and a vendor of products, the system comprising:

a computerized banking system comprising:
      plurality of financial institutions;
      each of said plurality of financial institutions comprising a computer centre comprising a plurality of computer based client accounts;
      said computer centres being interconnected by an electronic data network;
      a plurality of data exchange terminals connected to said electronic data network;
      at least one vendor database comprising product related information connected to said network; and
      system software providing, via the network, communication of the product related information between said plurality of terminals and said at least one vendor database, and for initiating payment by the purchaser for products purchased from said vendor database.

17. A system according to claim 16 wherein the data exchange terminal is a bank service terminal.

18. A system according to claim 16 wherein the data exchange terminal includes printing means for issuing a record of the transaction or a voucher which serves as proof of the transaction.

19. A system for conducting a financial transaction between a purchaser and a vendor of a product, the purchaser and the vendor being associated with respective first and second accounts held at respective first and second financial institutions, the system comprising:

a data exchange terminal including data input and output means;
   at least one vendor database including product-related information;
   communication means for linking the terminal to the at least one vendor database, the first financial institution and the second financial institution; and
   system software providing communication of product-related information of a transaction between the terminal and the at least one vendor database, and for transferring funds electronically between the first and second accounts for the value of the transaction.

20. A system according to claim 19 wherein the first and second financial institution are the same financial institution.

21. A system according to claim 19 wherein the communication means comprises an ATM network to which the data exchange terminal, the at least one vendor database, and the first and second financial institutions are linked to facilitate the communication therebetween.

22. A system according to claim 19 wherein the system software facilitates the transfer of funds electronically between the first and second accounts in real time response at the conclusion of the transaction, or at a future predetermined time.

23. A system according to claim 19 wherein the terminal, the first or second financial institution or the at least one vendor database have storage means for storing the product-related information, at least part of the system software or transaction records, and wherein the product-related information or the transaction records are accessible at the data exchange terminal.

24. A system according to claim 19 including a portable storage device adapted to store product-related information and/or at least part of the system software and/or transaction records.

25. A system according to claim 24 wherein the portable storage means comprises a smart card.

26. A system according to claim 25 wherein the product-related information is accessible via a data output means of the data exchange terminal and is updatable in real time or on the occurrence of a transaction between the purchaser and the vendor.

27. A system according to claim 19 wherein the data output means of the data exchange terminal includes a screen, and the system software includes menu drivers for producing enquiry menus on the screen using which the purchaser provides transaction-related information via the data input means of the data exchange terminal to the system.

28. A system according to claim 27 wherein the enquiry menus include icons associated with transaction options, and the purchaser is able to select a transaction option by selecting an icon using the data input means.

29. A system according to claim 19 wherein the communication means includes conventional telephone lines or dedicated communication lines and interface means for allowing the at least one vendor database to communicate with the data exchange terminal utilizing established ATM message protocols.

30. A system according to claim 19 wherein the data input means of the data exchange terminal includes a reader for reading an indicator means configured by the purchaser to indicate transaction-related information.

31. A system according to claim 30 wherein the reader comprises an optical reading device, and the indicator means comprises a card configurable to visually indicate the transaction-related information.

32. A system for conducting a financial transaction between a purchaser and a vendor of products, the system comprising;

an electronic data network including a plurality of bank service terminals for use by a purchaser;

at least one vendor database comprising product related information connected to said electronic data network and accessible from said terminals; and system software providing communication of product related information between said terminals and said at least one vendor database and for initiating payment by the purchaser through said electronic data network for products purchased.

* * * * *